United States Patent
Chen et al.

(10) Patent No.: US 9,058,169 B2
(45) Date of Patent: Jun. 16, 2015

(54) METHOD AND SYSTEM FOR WAKING UP REMOTE DEVICES

(75) Inventors: Xiangning Chen, Jiangsu (CN); Jie Zhang, Jiangsu (CN); Lifang Hao, Jiangsu (CN)

(73) Assignee: Nanjing University, Jiangsu (CN)

( * ) Notice: Subject to any disclaimer, the term of this patent is extended or adjusted under 35 U.S.C. 154(b) by 248 days.

(21) Appl. No.: 13/882,410

(22) PCT Filed: Sep. 8, 2011

(86) PCT No.: PCT/CN2011/079460
§ 371 (c)(1),
(2), (4) Date: Apr. 29, 2013

(87) PCT Pub. No.: WO2012/055301
PCT Pub. Date: May 3, 2012

(65) Prior Publication Data
US 2013/0219204 A1    Aug. 22, 2013

(30) Foreign Application Priority Data

Oct. 28, 2010 (CN) .......................... 2010 1 0522794

(51) Int. Cl.
G06F 1/32 (2006.01)
H04M 1/738 (2006.01)
H04W 52/02 (2009.01)

(52) U.S. Cl.
CPC ............. *G06F 1/3234* (2013.01); *H04M 1/738* (2013.01); *H04W 52/0229* (2013.01)

(58) Field of Classification Search
CPC ............ G06F 1/3209; H04L 12/40039; H04L 12/40045
USPC ......................................................... 713/310
See application file for complete search history.

(56) References Cited

U.S. PATENT DOCUMENTS

2011/0107116 A1 * 5/2011 Diab et al. .................... 713/300

FOREIGN PATENT DOCUMENTS

| | | |
|---|---|---|
| CN | 1599320 | 3/2005 |
| CN | 1878071 | 12/2006 |
| CN | 101964714 | 2/2011 |
| CN | 101980472 | 2/2011 |
| EP | 1857911 | 11/2007 |

* cited by examiner

Primary Examiner — Albert Wang
(74) Attorney, Agent, or Firm — The Farrell Law Firm, P.C.

(57) ABSTRACT

Disclosed are a method and a system for remote wake-up and status check, with a wake-up signal generating unit generating and transmitting a wake-up signal to wake up an electricity supply unit of a remote device to operate normally and provide electricity for the remote device. The wake-up signal has an assigned electric voltage with specific characteristics for detection by the electricity supply unit while in power-off mode and, upon signal detection, the electricity supply unit wakes up to provide normal electric voltage output. The wake-up signal generating unit determines, according to an electric current on a wake-up signal feed line, whether the remote device is in an active mode. A low wake-up energy consumption enables system wake-up and a true powered-off sleep mode.

11 Claims, 6 Drawing Sheets

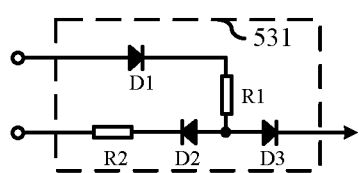
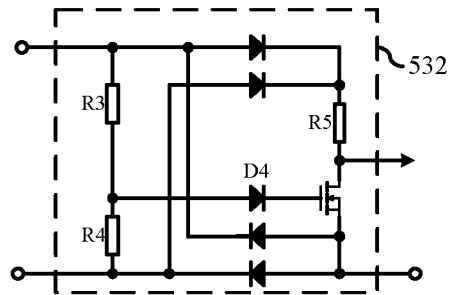
Figure 11
Figure 12
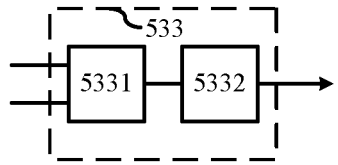
Figure 13
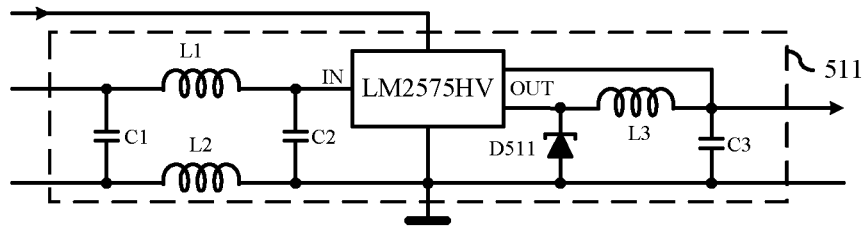
Figure 14
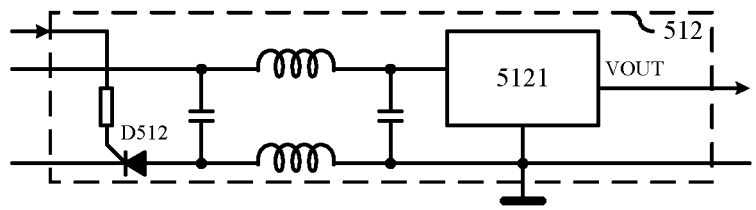
Figure 15
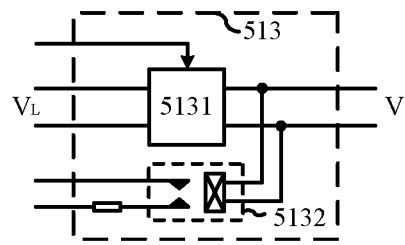

Figure 16
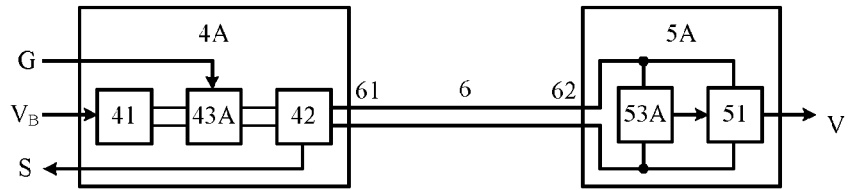
Figure 17
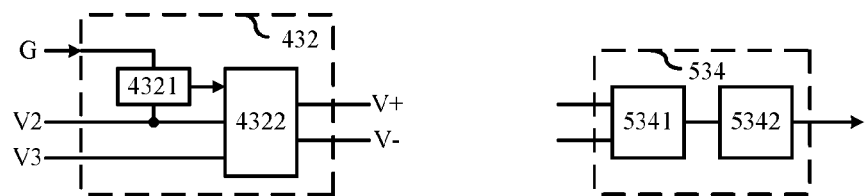
Figure 18 Figure 19
Figure 20
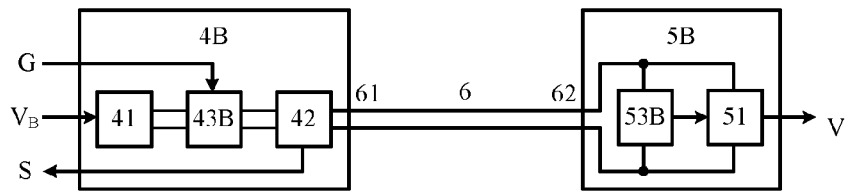
Figure 21
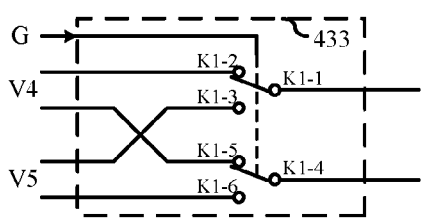
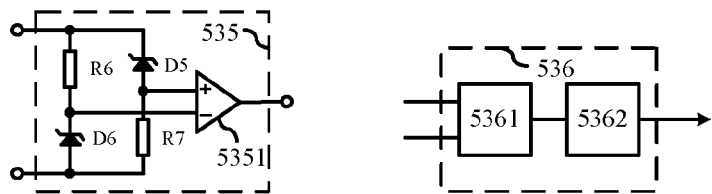

Figure 22
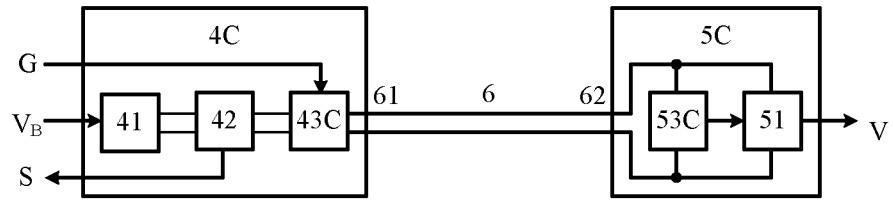
Figure 23
Figure 24
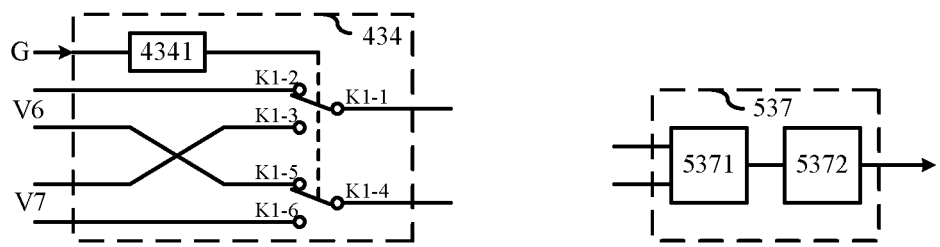
Figure 25
Figure 26
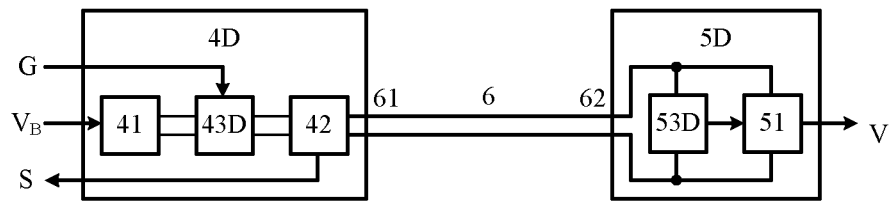
Figure 27
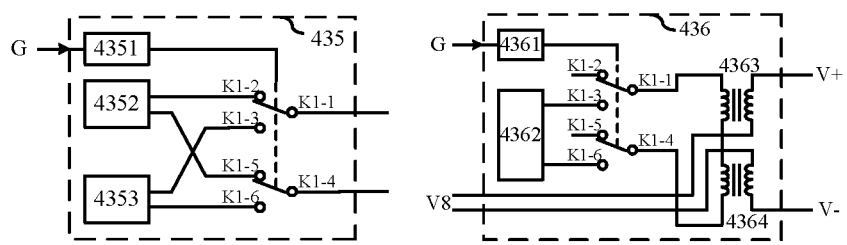
Figure 28
Figure 29
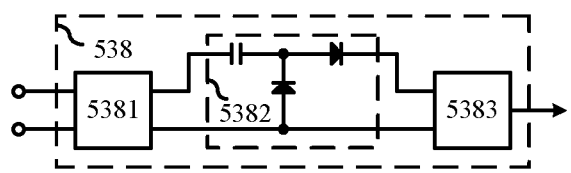

Figure 30
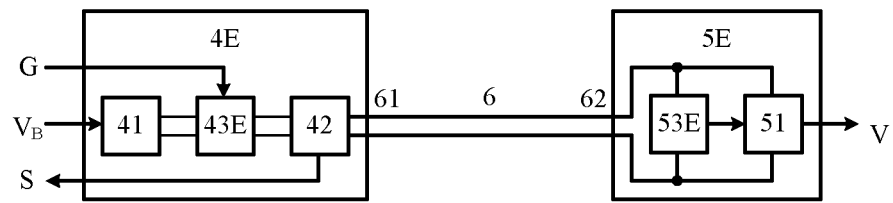
Figure 31
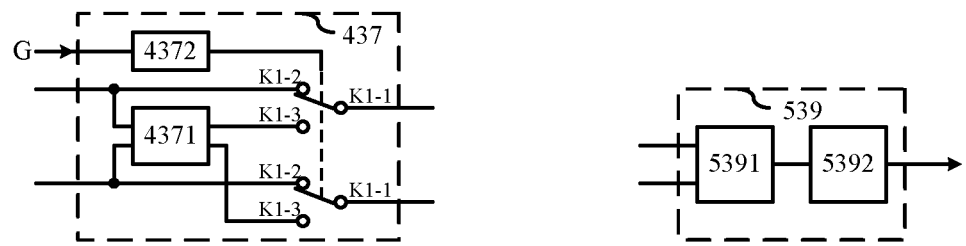
Figure 32
Figure 33

METHOD AND SYSTEM FOR WAKING UP REMOTE DEVICES

FIELD OF THE INVENTION

The present invention pertains to a method and a system for controlling the power consumption of remote devices, in particular a method and a system for waking up remote devices through cable lines.

BACKGROUND OF THE INVENTION

Ordinary fixed telephone systems have remote waking-up and state detection capability, i.e., the central office equipment can remote wake up terminal units and detect the state of terminal units through twisted pair lines.

FIG. 1 shows a block diagram of the subscriber network interface part of an ordinary telephone system, comprising a central office interface equipment 1, a telephone set 2, and twisted pair lines 3 that connect the central office interface equipment 1 and telephone set 2, wherein, the central office interface equipment 1 further comprises a voice receiving/transmitting module 11, a power supply and monitoring module 12, a ringing generator module 13, and transformers 14 and 15; the telephone set comprises a voice processing module 21, a regulated power supply module 22, a ringing module 23, a switch hook 24, a rectifier module 25, an earphone externally connected to a port E, and an microphone externally connected to a port M.

According to the standard of GB-T15279, in on-hook state, the switch hook 24 of telephone set 2 is in open state, the leak current in the telephone set shall be lower than 25 mA, and the feeding voltage outputted from the central office interface equipment 1 shall be 48V DC; in off-hook state, the switch hook 24 is in closed state, the DC resistance of the telephone set is lower than 350Ω, and the power consumption of the telephone set is about 18-60 mA in normal operating state. After the power supply and monitor module 12 judges that the telephone set is in off-hook and active state by detecting the feeding current, on one hand, it will send the active state via a port W to other modules at the office side for further treatment; on the other side, it will adjust its output voltage to about 10V. The power supply and monitor module 12 that supports remote billing indication also has a function of swapping feeding voltage polarity, i.e., it can swap the positive/negative polarity of feeding voltage outputted through the twisted pair line 3 according to the signal indication from a power feeding control port J after the session connection is established.

A ringing generator module 13 is arranged in the central office interface equipment 1 has, and a ringing module 23 is provided on the telephone set 2. To inform the called telephone subscriber of an incoming call, the ringing generator module 13 generates AC voltage with approximate 90V, 25 Hz from the input voltage $V_R$, outputs the voltage via transformers 14 and 15 to the twisted pair line 3 connected to the telephone set, and then applies the voltage to the ringing module 23 in the telephone set 2 through the twisted pair line 3, so as to drive the ringing module 23 to ring up. The ringing generator module 13 generates ringing voltage in an intermittent manner, i.e., working for is and pausing for 4 s. In the is period when the ringing generator module 13 outputs ringing voltage, the feeding voltage output and the feeding current detection of the power supply and monitoring module 12 are disabled; in the 4 s period when the ringing generator module 13 pauses ringing voltage output, the feeding voltage output and the feeding current detection of the power supply and monitoring module 12 are enabled.

When the telephone subscriber picks up the phone, the switch hook 24 will be closed manually, and more circuit modules in the telephone set 2 will begin to work and consume electric current, resulting in greatly increased feeding current flowing through the twisted pair line 3 connected to the telephone set; thus, the power supply and monitoring module 12 can judge that the telephone set 2 is in off-hook and active state by detecting the feeding current.

The above waking up method used in simulation telephone system requires a separate ringing generator unit; in addition, there is a confliction between the simulation telephone system and the current detection system of on/off-hook state, and the structure of the system is very complex. Moreover, the 90V AC ringing approach results in high power consumption and high cost, which do not meet the demand for energy conservation and environmental protection; therefore, that approach should be abandoned.

In today's information age, ordinary telephone sets are gradually substituted by digital subscriber line (DSL) modems. People expect DSL modems can operate with remote power supply from the office side, similar to the ordinary telephone sets; when there is no data to transmit, the modem should enter into sleep state in which it almost consumes no power; when there is data to transmit locally, the modem should actively start up into operating state; when the modem is called by other network devices, it should be waken up into operating state by the central office equipment.

However, the waking-up and calling approach of ordinary telephone sets is only suitable for manual operation, but is not suitable for DSL modem's operate mode. For a telephone line connected with a plurality of devices, manual control can ensure only one unit is in online state, while a DSL modem cannot. If two units actively start up into operating state at the same time on a telephone line, or they start up into operating state because they receive calling signals at the same time, usually the DSL modem cannot establish a normal connection.

At present, other remote waking-up techniques disclosed in the art are related to remote waking-up computers. These waking-up methods require that the computer is equipped with a chassis power that can supply additional sleep power, and a motherboard and a network card that support remote waking-up. Actually, all the chassis power, motherboard, and network card are in live working state; the operating current drops greatly only because the parts that consume high power are shut down, which is to say, the computer is not in true power-off state entirely without consuming power.

In addition, some devices in homes or office locations also require remote waking-up for power supply, such as cameras and smart light fixtures that operate intermittently. At present, these devices have to be started up manually or always kept in ON state, and cannot realize remote waking up.

The present invention intends to solve or alleviate one of the problems described above.

SUMMARY OF THE INVENTION

To explain the object of the present invention in summary, hereafter4 some aspects, advantages, and novel characteristics of the present invention are described. It should be understood that not all these aspects, advantages, and characteristics have to be included in any specific embodiment.

The object of the present invention is to provide a method and a system for remote waking-up and state detection through devices interconnected with a cable line.

The method for waking up remote devices according to the present invention is characterized in: it comprises a wake-up signal generator unit, remote device power supply units, and a wake-up signal feeding line that connects the wake-up signal generator unit and remote device power supply units, wherein, said wake-up signal generator unit comprises a power supply module, a wake-up signal generator module, and a current detection module; said remote device power supply unit comprises a wake-up signal detection module and a controllable power supply module.

Hereunder the voltage signal with specified characteristics corresponding to the time when the remote device do not have to be waken up is referred to as a normal state signal, the voltage signal with specified characteristics that is used to wake up the remote device and is different to the normal state signal is referred to as a wake-up signal, and the voltage signal with specified characteristics that is used to indicate the remote device has been waken up and is in active state and is different to the normal state signal is referred to as an occupation signal.

The wake-up signal generator unit can generate voltage signals with different characteristics, including the wake-up signal; the remote device power supply unit can receive and identify the wake-up signal in sleep state.

When said remote device power supply unit is in sleep state and does not output supply voltage required for normal operation of the remote device, said wake-up signal generator unit will generate a wake-up signal as instructed by an external control signal inputted from a wake-up control port, and send the wake-up signal to said remote device power supply unit through the wake-up signal feeding line.

After said remote device power supply unit in sleep state correctly identifies the arriving wake-up signal, it will wake up said remote device power supply unit to operate normally, generate and output supply voltage required for normal operation of the remote device, so as to wake up the remote device from power-off state.

Preferably, the voltage signals with different characteristics generated by said wake-up signal generator unit are DC voltage or DC voltage pulse codes with specified polarity and amplitude, and said wake-up signal that is different to the normal state signal is a DC voltage or DC voltage pulse code with polarity or amplitude different to the polarity or amplitude of the normal state.

Preferably, the voltage signals with different characteristics generated by said wake-up signal generator unit are AC voltage or AC voltage pulse codes with specified frequency, phase, and amplitude, and said wake-up signal that is different to the normal state signal is an AC voltage or AC voltage pulse code with frequency, phase, or amplitude different to the frequency, phase, or amplitude of the normal state.

Preferably, said wake-up signal generator unit also detects the current outputted to the wake-up signal feeding line, and judges that the remote device is already in wake state when the feeding current exceeds a predetermined threshold value.

Preferably, said wake-up signal generator unit can generate a variety of different wake-up signals.

When said remote device power supply unit is in sleep state and does not output supply voltage required for normal operation of the remote device, said wake-up signal generator unit will selectively generate a specific wake-up signal as instructed by an external control signal inputted from an wake-up control port, and send the wake-up signal to said remote device power supply unit through the wake-up signal feeding line.

After said remote device power supply unit in sleep state correctly identifies the arriving specific wake-up signal, it will wake up said remote device power supply unit to operate normally, generate and output supply voltage required for normal operation of the remote device, so as to wake up the remote device from power-off state.

Preferably, the voltage with different characteristics are DC voltage pulse codes with specified polarity and amplitude, or AC voltage pulse codes with specified different frequencies or a combination of frequencies, or AC voltage pulse codes with specified amplitude and phase; said wake-up signals are a specified set of DC voltage pulse codes with polarity or amplitude different to the polarity or amplitude of the normal state, or a specified set of AC voltage pulse codes with phase or amplitude different to the phase or amplitude of the normal state, or a specified set of AC voltage signals with a combination of different frequency codes.

Preferably, after said remote device power supply unit detects a wake-up signal from the wake-up signal feeding line via the wake-up feeding line port, it will take five steps to wake up said remote device power supply unit in sleep state:
(1) the remote device power supply unit waits for the wake-up signal in the wake-up signal feeding line to disappear, till the normal state signal occurs again;
(2) the remote device power supply unit further continues waiting for a random period of time;
(3) if an occupation signal is detected from the wake-up feeding line port during the delayed waiting period, the remote device power supply unit will freeze the waking-up operation, and terminate the waking-up process till the normal state signal is sent again through the wake-up signal feeding line, and remain in sleep state;
(4) if no occupation signal is detected from the wake-up signal feeding line during the delayed waiting period, the remote device power supply unit will output normal supply voltage, so as to wake up the remote device from sleep state into normal operating state;
(5) after the wake-up signal generator unit judges that the remote device is already in wake state, it will generate an occupation signal and output the occupation signal to the wake-up signal feeding line.

Said occupation signal is a DC voltage or DC voltage pulse with polarity or amplitude different to the polarity or amplitude of the normal state, or an AC voltage or AC voltage pulse with frequency, phase or amplitude different to the frequency, phase, or amplitude of the normal state.

Preferably, when the remote device is to wake up itself, the remote device power supply unit will wake up said remote device power supply unit in sleep state through three steps:
(1) if the remote device power supply unit detects a normal state signal from the wake-up feeding line port, it will output normal supply voltage, so as to wake up the remote device from sleep state into normal operating state;
(2) if the remote device power supply unit detects an occupation signal from the wake-up feeding line port, it will freeze the waking-up operation, till a normal state signal is sent again from the wake-up signal feeding line; then, the remote device power supply unit will wait for a random delay period, and then restart the self-wake-up process from step (1);
(3) after the wake-up signal generator unit judges that the remote device is already in wake state, it will generate an occupation signal and output the occupation signal to the wake-up signal feeding line.

Said occupation signal is a DC voltage or DC voltage pulse with polarity or amplitude different to the polarity or amplitude of the normal state, or an AC voltage or AC voltage pulse with frequency, phase or amplitude different to the frequency, phase, or amplitude of the normal state.

The remote waking-up system for waking up remote devices in power-off state according to the present invention comprises a wake-up signal generator unit, a remote device power supply unit, and a wake-up signal feeding line, wherein:

Said wake-up signal feeding line is a conductive cable that connects the wake-up signal generator unit and remote device power supply unit and transmits the wake-up signal generated by the wake-up signal generator unit and the power supply state signal generated by the remote device power supply unit;

Said wake-up signal generator unit is designed to generate a wake-up signal to wake up the remote device and detect the state of the remote device, and it comprises:

a power supply input port designed to provide local input power, a wake-up control port designed to receive external control signals, a remote device state output port designed to output the active state of the remote device, a feeding line output port designed to feed wake-up signal voltage to the remote device, and a power supply module that utilizes the power input from the power supply input port to supply power to all other modules;

wherein, said wake-up signal generator unit further comprises:

a wake-up signal generator module designed to generate a wake-up signal under the control of the external control signal provided from the wake-up control port and output the wake-up signal from the feeding line output port, and a current detection module designed to detect the power supply state signal of the remote device power supply unit and output the power supply state via an remote device state output port S;

Said current detection module is connected in series between the voltage output terminal of said power supply module and said feeding line output port via said wake-up signal generator module;

Said wake-up signal is a DC voltage or DC voltage pulse code with polarity or amplitude different to the polarity or amplitude of the normal state, or an AC voltage or AC voltage pulse code with frequency, phase or amplitude different to the frequency, phase, or amplitude of the normal state;

Said power supply state signal is feeding current.

Said remote device power supply unit can be waken up from sleep state and generate local power supply output, and feed back a power supply state signal. It comprises:

a wake-up feeding line port designed to receive wake-up signal from the wake-up signal feeding line, and a supply voltage output port designed to output operating power supply to the local modules, wherein, said remote device power supply unit further comprises:

a wake-up signal detection module designed to detect voltage signals with different characteristics inputted from the wake-up feeding line port, judge whether the input voltage signal is a wake-up signal, and output wake-up indication according to the detection result, a controllable power supply module designed to receive and treat the input voltage from the wake-up feeding line port, output local normal operating supply voltage from the supply voltage output port, and output power supply state signal via the wake-up feeding line port, according to the wake-up indication outputted from the wake-up signal detection module;

Said wake-up signal is a DC voltage or DC voltage pulse code with polarity or amplitude different to the polarity or amplitude of the normal state, or an AC voltage or AC voltage pulse code with frequency, phase or amplitude different to the frequency, phase, or amplitude of the normal state;

Said power supply state signal is feeding current.

The Present Invention has the Following Beneficial Effects:

1. Low Waking-Up Power Consumption

If a conventional 90V ringing wake-up approach is used, ringing power higher than 1 W has to be provided by the office side during the ringing period. For the central office equipment that has high port density, both the power consumption and the heat dissipation are challenges; as a result, further improvement of integration level is restricted. However, with the remote wake-up method according to the present invention, the required power is no more than several milliwatts; therefore, the difficulties in power consumption and thermal design of the central office equipment are greatly reduced, without impacting the original waking-up capability. Thus, the method provided in the present invention meets the trend of low carbon economy.

2. Lowered Requirement for Voltage Withstand Process

With the technical scheme of the present invention, the ringing generator module that generates voltage as high as 90V AC is completely omitted, the maximum operating voltage of the entire system is decreased to the DC voltage rating required for normal operation of the system, and the requirement for safety protection against electric leakage and electric shock and requirement for voltage withstand process of the system are greatly lowered; therefore, the system can be applied more widely and the integration level of the system itself can be further improved.

3. Wake Up a System in True Sleep State

An embodiment of the present invention can wake up the remote device by generating and identifying a reversed polarity voltage signal. The remote device can be in complete power-off state: when the remote device is to be waken up, the wake-up signal is only to be rectified so as to obtain the power required for waking up the power supply module, and the power supply can also be provided with the wake-up signal voltage. In that way, the phenomenon that the signaling-based waking-up method for waking up network card and modem, which both required the equipment provides maintain power with certain power, is avoided.

4. Wide Applicability and Easy Implementation

The methods for generation and identification reversed polarity voltage signal disclosed in the present invention are simple. An embodiment for generating a wake-up signal only requires a DPDT switch; an embodiment for identifying the wake-up signal only requires a diode; both the embodiments are easy to implement. The entire waking-up system simply comprises a wake-up signal generator unit, a remote device power supply unit, and a wake-up signal feeding line and does not involve any special application of remote device. Therefore, the method and system disclosed in the present invention are applicable to almost all cases in which remote wake-up function is required and cable connection is available. That is to say, the method and system disclosed in the present invention have wide applicability.

BRIEF DESCRIPTION OF THE DRAWINGS

To explain the embodiments of the present invention or the technical scheme in the prior art more clearly, hereunder the drawings required for description of the embodiments or the prior art are introduced briefly. Apparently, the accompanying drawings in the following description only illustrate some typical embodiments of the present invention, and shall not be deemed as constituting any limitation to the scope of the present invention. The present invention will be described and illustrated in more detail with reference to the accompanying drawings.

FIG. 11 is a schematic diagram of a conventional wake-up signal detection module, which can detect a DC voltage wake-up signal with polarity reversed to the polarity of normal state signal and generate a high-level wake-up indication signal.

FIG. 12 is a schematic diagram of a conventional wake-up signal detection module, which can detect a DC voltage wake-up signal with polarity reversed to the polarity of normal state signal and generate a low-level wake-up indication signal.

FIG. 13 is a schematic diagram of a wake-up signal detection module with memory function, which can detect a reversed polarity DC voltage wake-up signal and generate a wake-up indication signal.

FIG. 14 is a schematic diagram of a controllable power supply module, which has a regulated power supply chip with an enabled control port.

FIG. 15 is a schematic diagram of a controllable power supply module with a thyristor.

FIG. 16 is a schematic diagram of a controllable power supply module with a local power input port.

FIG. 17 is a system block diagram of an embodiment 2 according to the present invention.

FIG. 18 is a schematic diagram of a wake-up signal generator module, which can generate a DC voltage pulse code wake-up signal with polarity reversed to the polarity of normal state signal.

FIG. 19 is a schematic diagram of a wake-up signal detection module, which can intelligently identify a reversed polarity DC voltage pulse code wake-up signal.

FIG. 20 is a system diagram of an embodiment 3 according to the present invention.

FIG. 21 is a schematic diagram of a wake-up signal generator module, which can generate a voltage wake-up signal with amplitude different to the amplitude of normal state signal.

FIG. 22 is a schematic diagram of a wake-up signal detection module, which can detect a DC voltage wake-up signal with amplitude different to the amplitude of normal state signal and generate a wake-up indication signal.

FIG. 23 is a schematic diagram of a wake-up signal detection module with memory function, which can detect a voltage wake-up signal with amplitude different to the amplitude of normal state signal and generate a wake-up indication signal.

FIG. 24 is a system block diagram of an embodiment 4 according to the present invention.

FIG. 25 is a schematic diagram of a wake-up signal generator module, which can generate a voltage pulse code wake-up signal with amplitude different to the amplitude of normal state signal.

FIG. 26 is a schematic diagram of a wake-up signal detection module, which can intelligently identify a voltage pulse code wake-up signal with amplitude different to the amplitude of normal state signal.

FIG. 27 is a system block diagram of an embodiment 5 according to the present invention.

FIG. 28 is a schematic diagram of a wake-up signal generator module, which can generate AC voltage wake-up signals with a combination of specified frequency codes.

FIG. 29 is a schematic diagram of an improved wake-up signal generator module, which can generate AC voltage wake-up signals with a combination of specified frequency codes.

FIG. 30 is a schematic diagram of a wake-up signal detection module, which can intelligently identify AC voltage wake-up signals with a combination of different frequency codes.

FIG. 31 is a system block diagram of an embodiment 6 according to the present invention.

FIG. 32 is a schematic diagram of a wake-up signal generator module, which can generate AC voltage or AC voltage pulse codes with phase different to the phase of normal state signal.

FIG. 33 is a schematic diagram of a wake-up signal detection module, which can intelligently identify AC voltage or AC voltage pulse codes with phase different to the phase of normal state signal.

DETAILED DESCRIPTION OF THE EMBODIMENTS

Hereunder the embodiments according to the present invention are described. To simplify the description of these embodiments, not all characteristics of the actual implementation scheme are described here. It shall be understood that some other specific decisions for a specific application may have to be made in the development process of any actual implementation scheme, so as to meet the constraint conditions related with specific system and service. For those having ordinary skills in the art who can benefit from the content disclosed here, these complex and time-consuming specific decisions are only conventional tasks in design, manufacture, and production.

Embodiment 1

This embodiment provides remote waking-up system and method that utilize reversed polarity DC voltage as the wake-up signal.

In this embodiment, the remote waking-up system comprises: a wake-up signal generator unit 4, a remote device power supply unit 5, and a wake-up signal feeding line 6 that connects the wake-up signal generator unit 4 and the remote device power supply unit 5.

The wake-up signal generator unit 4 is designed to generate voltage signals with different characteristics, including wake-up signal, normal state signal, and occupation signal, and send the voltage signals to the remote device power supply unit 5 through the wake-up signal feeding line 6.

The remote device power supply unit 5 is designed to be waken up remotely from sleep state and generate local power supply output, and feed back a remote device power supply state signal to the wake-up signal generator unit 4 through the wake-up signal feeding line 6.

In addition, the wake-up signal generator unit 4 also detects the current outputted into the wake-up signal feeding line, and judges that the remote device is already in the operating state of being waken up when the current in the feeding line exceeds a predetermined threshold value.

The wake-up signal generator unit 4 can be a separate device, and can also be a part of other devices, similar to the power supply and monitoring module 12 in the central office interface equipment of ordinary analog telephone sets.

Figure 1:
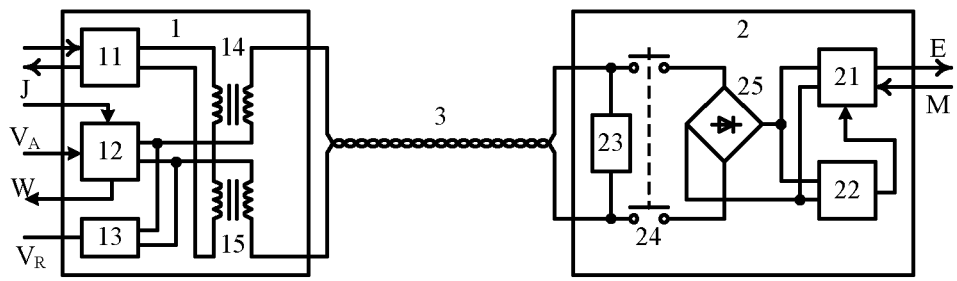
FIG. 1 is an implementation block diagram of the central office interface equipment and subscriber telephone set in the prior art.
Figure 2:
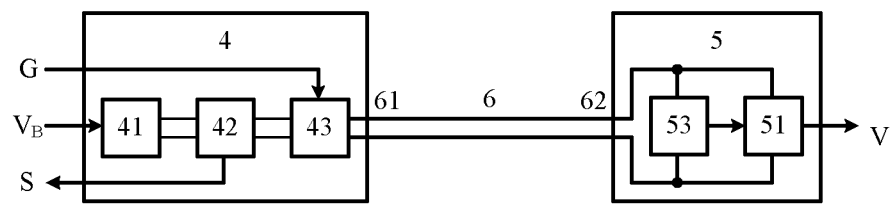
FIG. 2 is a system block diagram of an embodiment 1 according to the present invention.
Figure 3:
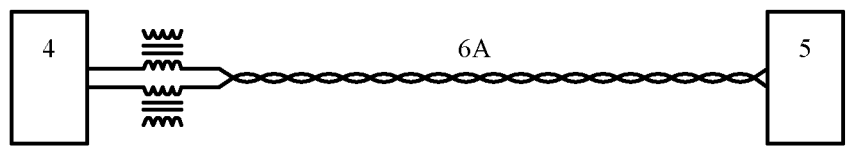
FIG. 3 is a schematic diagram of the feeding line connection in an example system, in which a pair of twisted pair lines is used as the wake-up signal feeding line.
Figure 4:
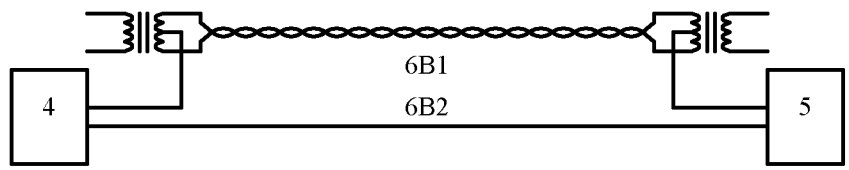
FIG. 4 is a schematic diagram of the feeding line connection, in which a pair of twisted pair lines and a conductive wire are used as the wake-up signal feeding line.
Figure 5:
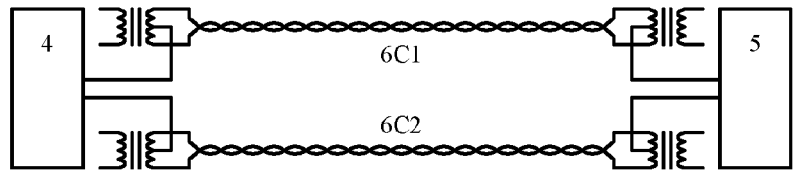
FIG. 5 is a schematic diagram of the feeding line connection, in which two pairs of twisted pair lines are used as the wake-up signal feeding line.

The connection between the wake-up signal generator unit 4 and the wake-up signal feeding line 6 can be a direct connection as shown in FIG. 2, and can also be a coupled connection via some intermediate device. As shown in FIGS. 3, 4 and 5, the wake-up signal generator unit 4 is connected to the wake-up signal feeding line by transformer coupling in different ways, respectively.

The wake-up signal feeding line 6 that is designed to connect the wake-up signal generator unit 4 and remote device power supply unit 5 and transmit the wake-up signal generated by the wake-up signal generator unit 4 and the power supply state signal generated by the remote device power supply unit 5 can be a conductive cable in various forms.

The simplest embodiments of the wake-up signal feeding line 6 is two parallel conductive wires. FIGS. 3, 4 and 5 show different embodiments of the wake-up signal feeding line 6 that adopt a pair of twisted pair lines 6A, a pair of twisted pair line 6B1 and a conductive wire 6B2, and a pair of twisted pair lines 6C1 and a pair of twisted pair lines 6C2. For low-frequency equivalent circuits, the embodiments of the wake-up signal feeding line in the embodiments are equivalent to the two parallel conductive wires shown in FIG. 2 in terms of circuit theory, owing to the fact that the coupling transformers in the described connection methods are equivalent to serially connected resistors and the twisted pair line is equivalent to a single straight wire for the transmission of wake-up signal and power supply state signal.

The remote device power supply unit 5 does not consume current in sleep state; therefore, there is no current or very low leak current in the wake-up signal feeding line. However, once the remote device power supply unit 5 is waken up into normal operating state, the wake-up signal feeding line can carry higher current as power supply state signal indication. When the current in the feeding line is lower than a predetermined threshold value (e.g., lower than 2 mA), the remote device power supply unit can be deemed as in sleep state; when the current in the feeding line is higher than a predetermined threshold value (e.g., higher than 5 mA), the remote device power supply unit can be deemed as in normal operating state.

If the two predetermined threshold values for judging sleep state and operating state are different to each other, an overlapped or undefined state may exist. For example, when the state in which the current in the feeding line is lower than 2 mA is defined as the sleep state and the state in which the current in the feeding line is higher than 5 mA is defined as the normal operating state, the state in which the current in the feeding line is between 2 mA and 5 mA will be an undefined state. Usually, undefined states may occur in cases that the wake-up signal feeding line is used as a bus and is connected with too many devices. The lower leak current of many devices may form high current after they superpose each other. The probability of occurrence of undefined state can be decreased or eliminated by reducing the connected operating devices simultaneously or reducing the gap between the two predetermined threshold values for judging sleep state and normal operating state.

The remote device power supply unit 5 provides operating power for the remote device when it operates normally. The power output can be DC power with constant voltage and can also be regulated or non-regulated DC power with various voltage values, and even AC power. The supply voltage output port shown in FIG. 2 only illustrates the position of supply voltage output, and it does not mean that only one type of supply voltage can be outputted.

The connection between the remote device power supply unit 5 and the wake-up signal feeding line 6 can be in a variety of forms, such as the direct connection shown in FIG. 2 and coupled connections shown in FIGS. 3, 4 and 5.

In this embodiment, said wake-up signal is DC voltage with polarity reversed to the polarity of the normal state signal. If the DC voltage with designated polarity applied in the wake-up signal feeding line is defined when the remote device is not in normal operating state, and the DC voltage is defined as the normal state signal, the wake-up signal can be specified as DC voltage with polarity reversed to the polarity of the normal state signal.

To facilitate the implementation of said wake-up signal generator unit and remote device power supply unit, the wake-up signal generator unit 4 in this embodiment comprises: a power supply input port $V_B$, a wake-up control port G, a remote device state output port S, a feeding line output port 61, a power supply module 41, a current detection module 42, and a wake-up signal generator module 43. The remote device power supply unit 5 comprises: a wake-up feeding line port 62, a wake-up signal detection module 53, a controllable power supply module 51, and a supply voltage output port V.

Said power supply module 41 obtains electric power from the power supply input port $V_B$, transforms the voltage, and then outputs the power to other modules in the wake-up signal generator unit.

The power supply module 41 can output different types of supply voltage, and can provide various implementation schemes such as AC input/AC output, AC input/DC output, DC input/AC output, and DC input/DC output. For all these implementation schemes, there are proven products available in the market.

For example, the standard isolated DC-DC regulated power supply units from Texas Instruments can generate 3.3V voltage output (model PT4141), 5V voltage output (model PT4142), 12V voltage output (model PT4244), and 15V voltage output (model PT4564). In addition, many companies, such as Shenzhen Hwadar-Enersys Power Equipment Co., Ltd., Beijing Huize Weiyie Co., Ltd., Shanghai Yize Electric Co., Ltd., etc., supply 48V standard communication power supply modules and many other models of DC regulated power supply modules.

Figure 6:
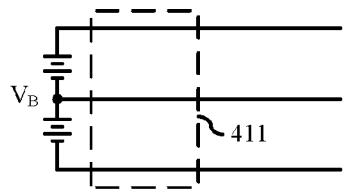
FIG. 6 is a schematic diagram of a battery-powered power supply module.
Figure 7:
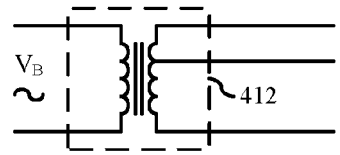
FIG. 7 is a schematic diagram of a power supply module, which utilizes tapped transformers to implement AC input and AC output.

For a system that is powered steadily with battery, the power supply module can even be a module 411 connected through simple straight wires shown in FIG. 6. For an AC input/AC output power supply module, it can be implemented with the tapped output transformers shown in FIG. 7, and can also be another standard AC voltage regulator module or frequency convention and voltage regulator device available in the market.

Figure 8:
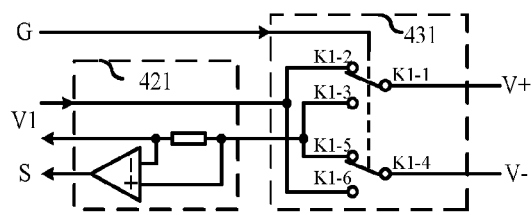
FIG. 8 is a schematic diagram of a wake-up signal generator module, which can generate a DC voltage wake-up signal with polarity reversed to the polarity of normal state signal and is connected in series with a DC current detection module.

Said wake-up signal generator module 43 outputs a DC voltage wake-up signal with polarity reversed to the polarity of the normal state signal to the feeding line output port 61, according to the signal indication from the wake-up control port G. The wake-up signal generator module 43 can be implemented with a double-pole double-throw (DPDT) switch K1 or a relay device, as shown in FIG. 8. The wake-up signal generator module 431 comprises a DPDT switch K1, which can be the controlled switch part of a relay device and change the input voltage V1 into required polarity and then output the voltage. The output terminals V+ and V− do not represent the polarity of output voltage; instead, they only indicate two different polarities of output voltage in normal signal state. The wake-up signal generator module 43 can also be implemented with a full-bridge drive circuit. For example, proven commercial chips, such as LMD18245 produced by National Semiconductor (USA), UBA2036 produced by NXP (the Netherlands), and A3959 produced by Allegro, etc., can be used to conveniently control outputting DC voltage wake-up signals with different polarities according to the signal indication from the wake-up control port G. See the recommended reference designs in the manuals of these chips for the specific circuits.

The occupation signal is defined as DC voltage with polarity reversed to the polarity of the normal state signal. The wake-up signal generator module 43 will generate and output an occupation signal when it receives an external control signal.

Figure 9:
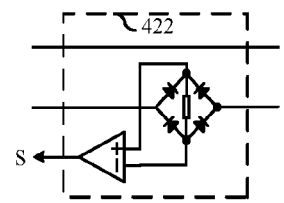
FIG. 9 is a schematic diagram of an AC current detection module.
Figure 10:
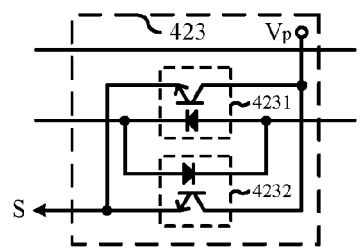
FIG. 10 is a schematic diagram of a current detection module implemented with optical coupling components.

Said current detection module 42 can be an ammeter, and can also be a DC current detection module 421 shown in FIG. 8, or an AC current detection module 422 shown in FIG. 9; it can be a current detection module 423 shown in FIG. 10, comprising optical coupling components 4231 and 4232, with Vp terminal connected to the positive terminal of power supply module 41; it can also be implemented with a proven chip available in the market, such as the chip LT2940 from Linear Technology. Please see the description and recommended reference designs in the manuals of the chips for the specific circuits. The specific position of the current detection module 42 can be arranged according to the nature of the current detection module 42; for example, a DC current detection module shall be arranged between the power supply module 41 and the wake-up signal generator module 43, while an AC current detection module shall be arranged between the power supply module 41 and the wake-up signal generator module 43 or after the wake-up signal generator module 43.

Said wake-up signal detection module 53 can generate and output wake-up indication when it detects a wake-up signal, so that the controllable power supply module 51 can supply electric power and enter into normal operating state, and thereby output steady supply voltage to the local device.

The wake-up signal detection module 53 can be implemented with the wake-up signal detection module 531 shown in FIG. 11. When the normal state signal is inputted, the wake-up signal detection module 531 cannot provide valid wake-up indication at the output terminal, because of the reverse cut-off function of serially connected diodes D1 and D2. When a wake-up signal with reversed voltage polarity is inputted, both the diodes D1 and D2 will gate on, and the wake-up signal voltage with reserved polarity will be divided by resistors R1 and R2, and then output via a diode D3, as an enabled signal for controlling the controllable power supply module 51.

Alternatively, the wake-up signal detection module 53 can also be implemented with the wake-up signal detection module 532 shown in FIG. 12. When a normal state signal is inputted, a diode D4 will cut off in the reversed direction, and the field effect tube will also cut off, and therefore a high-level signal will be outputted by a resistor R5, indicating there is no wake-up signal. When a wake-up signal is inputted, the diode D4 will gate on, and the field effect tube will also gate on, and therefore the wake-up signal detection module 532 will output a low-level signal, which can be used as an enabled signal for controlling the controllable power supply module 51.

Alternatively, the wake-up signal detection module 53 can also be implemented with the wake-up signal detection module 533 with memory function shown in FIG. 13. The wake-up signal detection module 533 comprises a conventional wake-up signal detection module 5331 and an intelligent processing module 5332. Said conventional wake-up signal detection module 5331 can be the wake-up signal detection module 531 shown in FIG. 11 or the wake-up signal detection module 532 shown in FIG. 12. The intelligent processing module 5332 can be designed with pure digital logic components, or implemented with a Field Programmable Gate Array (FPGA), or can be implemented with an intelligent chip, such as a singlechip 51 or an ARM embedded intelligent chip. After the conventional wake-up signal detection module 5331 detects a wake-up signal and outputs signal indication, the intelligent processing module 5332 can keep the wake-up signal in memory for a period and output persistently within the valid memory period.

Said controllable power supply module 51 can be a remote power-supply-controllable power supply module that obtains electric power from the wake-up signal feeding line, and can also be a local power controllable power supply module that directly obtains electric power locally.

For a remote power supply controllable power supply module, the controllable power supply module 51 can be the controllable power supply module 511 shown in FIG. 14. A preferred embodiment of the controllable power supply module 511 comprises three parts of circuit: an input filter circuit (C1, L1, L2 and C2), an integrated voltage regulator circuit (LM2575HV, L3 and D511), and an output filter circuit (C3). When said controllable power supply module 511 receives a low-level valid wake-up indication signal outputted from the wake-up signal detection module 53, it will obtain electric power from the wake-up signal feeding line, and then output constant voltage after transforming, so as to provide steady DC voltage to the local device. In that state, the controllable power supply module 511 consumes higher current, and takes the current as a power supply state signal and outputs the signal via the wake-up feeding line port.

A preferred embodiment of the controllable power supply module 511 employs an integrated voltage regulator circuit chip LM2575HV with enabled control. More typical DC regulated power supply may have no enabled control port. In that state, the controllable power supply module 512 shown in FIG. 15 can be used. To enable the controllable power supply module to obtain electric power persistently after receiving the wake-up indication, a unidirectional thyristor D512 is connected in series at the input terminal. When positive triggering voltage is inputted at the input terminal of the thyristor, the thyristor will gate on, the voltage regulator circuit 5121 will operate and output steady DC voltage. The voltage regulator circuit 5121 can be any commercial proven regulated power supply module.

Since the voltage polarity in the wake-up signal feeding line may be reversed, a rectifier module shall be connected in series in the input part of the regulated power supply module, so as to ensure correct polarity of input power required for normal operation of the DC regulated power supply module.

The controllable power supply module 51 can be implemented with a proven chip available in the market, such as PKM5000D produced by Ericsson (Shanghai), pA78S40 produced by Motorola, TNY268 produced by POWER, and NCP3063 produced by ON Semiconductor, etc., except for LM2575HV produced by National Semiconductor (USA). Please see the description and recommended reference designs in the manuals of the chips for the specific circuits.

For a local power supply controllable power supply module, the controllable power supply module 51 can be implemented with the controllable power supply module 513 shown in FIG. 16. That module has a local power input port $V_L$, and obtains electric power from the local power input port $V_L$. After the controllable power supply module 513 receives a wake-up indication from the wake-up signal detection module 53, it will obtain electric power from the local power input port $V_L$, and then output the voltage after transforming, so as to provide steady DC voltage for the local device.

To feed back the operating state of the remote device to the wake-up signal generator unit, a remote device operating state signal generator module 5132 is required when the local power supply controllable power supply module 513 is used. Preferably, the remote device operating state signal generator module is a relay, with the connection mode as indicated in FIG. 16. The regulated power supply module 5131 in FIG. 16 can be the controllable power supply module 511 or the controllable power supply module 512.

When the regulated power supply module 5131 outputs voltage normally, the relay that is used as the remote device operating state signal generator module 5132 will close, so as to provide a current circuit for the wake-up signal feeding line 6 and generate feeding line current as remote device power supply state indication. When the regulated power supply module is in sleep state and has no voltage output, the winding at the control port of the relay will have no current, the switch at the controlled terminal will turn off, and the wake-up signal feeding line 6 will have no current.

In initial state, all remote device power supply units are in sleep state, the wake-up signal generator unit 4 outputs normal state signal, and the wake-up signal feeding line 6 has no current; therefore, the wake-up signal generator unit 4 detects that the current in the wake-up signal feeding line 6 is lower than the preset threshold value, and judges that the remote device is in sleep state, and outputs the state signal via the remote state output port S.

The wake-up signal generator module 4 can generate a DC voltage wake-up signal with polarity reversed to the polarity of the normal state signal, so as to wake up the remote device power supply units connected to the wake-up signal feeding line 6. There are two cases:

Case 1: all remote device power supply units connected to the wake-up signal feeding line 6 are waken up instantly when a wake-up signal is received. That process can be accomplished through three steps.
(1) When the remote device power supply units in sleep state are required to be waken up into normal operating state, the wake-up signal generator unit 4 will generate a DC voltage wake-up signal with polarity reversed to the polarity of the normal state signal as instructed by an external control signal inputted from the wake-up control port G, and send the wake-up signal to the remote device power supply units through the wake-up signal feeding line 6.
(2) After the remote device power supply units receive the wake-up signal, on one hand, the wake-up signal detection module will detect and confirm the received signal is the specified wake-up signal, and then enable the controllable power supply module to operate normally; on the other hand, the wake-up signal feeding line 6 will be used as the power input cable of the controllable power supply module to obtain electric power, or obtain the electric power directly from the local power input port $V_L$, and generate supply voltage output required for the remote devices after transforming, so as to wake up the remote devices from power-off state.
(3) The wake-up signal generator unit 4 is informed that the remote devices have been waken up successfully by detecting that the current in the wake-up signal feeding line 6 is higher than the predetermined threshold value, and outputs a confirmation signal to the control center via the remote state output port S.

Case 2: when a plurality of remote device power supply units connected to the wake-up signal feeding line 6 receive wake-up signals, any one of the remote device power supply units are waken up, and it is forbidden that two or more remote device power supply units operate at the same time.

The specific process in the Case 2 of this embodiment can be accomplished through the following eight steps.
(1) The wake-up signal generator unit 4 confirms that all remote device power supply units connected to the wake-up signal feeding line 6 are in sleep state by detecting that the current in the wake-up signal feeding line 6 is lower than a predetermined threshold value and only a normal state signal exists in the wake-up signal feeding line 6.
(2) The wake-up signal generator unit 4 generates a wake-up signal and outputs the wake-up signal to the wake-up signal feeding line 6.
(3) The remote device power supply unit detects the wake-up signal in the wake-up signal feeding line 6, initiates the waking-up procedure of waiting for a normal state signal, and detects the voltage signal in the wake-up signal feeding line 6 and waits, till a normal state signal is detected.
(4) The wake-up signal generator unit 4 sends a normal state signal again after it sends the wake-up signal. The remote device power supply unit will continue waiting for a random period of time further, after it detects a normal state signal in the wake-up signal feeding line 6.
(5) If an occupation signal is detected from the wake-up feeding line port 62 during the delayed waiting period, the remote device power supply unit will freeze the waking-up operation, and terminate the waking-up process till the normal state signal is sent again through the wake-up signal feeding line, and continue keeping in sleep state.
(6) If no occupation signal is detected from the wake-up signal feeding line 6 during the delayed waiting period, the remote device power supply unit will output normal supply voltage, so as to wake up the remote device from sleep state into normal operating state.
(7) The wake-up signal generator unit 4 is informed that the remote device has been waken up successfully by detecting that the current in the wake-up signal feeding line 6 is higher than the predetermined threshold value, and outputs a confirmation signal to the control center via the remote state output port S.
(8) After the wake-up signal generator unit 4 judges that the remote device is already in wake-up state, it will generate an occupation signal and output the occupation signal to the wake-up signal feeding line 6.

When the remote device is to wake up itself, the remote device power supply unit will wake up said remote device power supply unit in sleep state through three steps:

(1) If the remote device power supply unit detects a normal state signal from the wake-up feeding line port 62, the remote device power supply unit will output normal supply voltage, so as to wake up the remote device from sleep state into normal operating state.

(2) If the remote device power supply unit detects an occupation signal from the wake-up feeding line port 62, the remote device power supply unit will freeze the waking-up operation, till a normal state signal is sent again from the wake-up signal feeding line 6; then, the remote device power supply unit will continue waiting for a random delay period of time, and then restart the self-wake-up process from step (1).

(3) After the wake-up signal generator unit 4 judges that the remote device is already in wake-up state, it will generate an occupation signal and output the occupation signal to the wake-up signal feeding line 6.

Embodiment 2

This embodiment provides remote waking-up system and method that utilize DC voltage pulse codes with different polarities as wake-up signals.

In this embodiment, as shown in FIG. 17, the remote waking-up system comprises: a wake-up signal generator unit 4A, remote device power supply units 5A, and a wake-up signal feeding line 6 that connects the wake-up signal generator unit 4A and remote device power supply units 5A. The wake-up signal generator unit 4A comprises: a power supply input port $V_B$, a wake-up control port G, a remote device state output port S, a feeding line output port 61, a power supply module 41, a current detection module 42, and a wake-up signal generator module 43A. The remote device power supply unit 5A comprises: a wake-up feeding line port 62, a wake-up signal detection module 53A, a controllable power supply module 51, and a supply voltage output port V.

Said wake-up signal generator module 43A outputs a DC voltage pulse code with polarity reversed to the polarity of the normal state signal to the feeding line output port 61 on the basis of given rules, according to the signal indication from the wake-up control port G. If the indication signal sent from the wake-up control port G is a voltage pulse in itself, it can be implemented with the wake-up signal generator module 431 shown in FIG. 8, according to the method identical to the implementation scheme in which the wake-up signal is DC voltage with polarity reversed to the polarity of the normal state signal. If the wake-up indication signal is DC voltage or certain digital code but a DC voltage pulse code must be outputted, it can be implemented with the wake-up signal generator module 432 shown in FIG. 18.

The wake-up signal generator module 432 comprises an intelligent pulse encoding module 4321 and a full-bridge drive circuit 4322. The intelligent pulse encoding module 4321 can be designed with pure digital logic components, or can be implemented with an intelligent chip, such as a 51 singlechip, or ARM embedded system, or FPGA, etc. After the intelligent pulse encoding module 4321 receives an external control signal, it will output the corresponding DC voltage pulse control waveform signal to control the full-bridge drive circuit 4322 to output a DC voltage pulse wake-up signal with reversed polarity. The full-bridge drive circuit may require two types of supply voltage: one is voltage supply V2 for full-bridge drive control circuit and the other is controlled supply voltage V3 for output.

The occupation signal is defined as DC voltage with polarity reversed to the polarity of the normal state signal. Since persistent reversed polarity DC voltage can also be deemed as a special DC voltage pulse, thus the wake-up signal generator module 43A should generate and output an occupation signal when it receives a specific external control signal.

Said wake-up signal detection module 53A can be implemented with the wake-up signal detection module 534 shown in FIG. 19.

The wake-up signal detection module 534 comprises a voltage polarity detection module 5341 and an intelligent processing module 5342. The voltage polarity detection module 5341 can be either implemented with the wake-up signal detection module 531 shown in FIG. 11, or implemented with the wake-up signal detection module 532.

The intelligent processing module 5342 can be designed with pure digital logic components, or implemented with a FPGA, or implemented with an intelligent chip, such as the singlechip 51 or an ARM embedded intelligent chip.

After the intelligent processing module 5342 receives voltage polarity indication from the voltage polarity detection module 5341, it will keep the voltage polarity indication in memory, compare and judge whether the received DC voltage pulse signal is the specified voltage pulse code, and persistently output a wake-up indication signal when the correct voltage pulse code is received.

The wake-up signal detection module 534 can have a plurality of wake-up indication signal output ports to control a plurality of controllable power supply modules.

In initial state, all remote device power supply units are in sleep state, the wake-up signal generator unit 4A outputs normal state signal, and the wake-up signal feeding line 6 has no current; therefore, the wake-up signal generator unit 4A detects that the current in the wake-up signal feeding line 6 is lower than the preset threshold value, and judges that the remote device is in sleep state, and outputs the state signal via the remote device state output port S.

The wake-up signal generator module 4A can generate a DC voltage pulse code wake-up signal with polarity reversed to the polarity of the normal state signal, so as to wake up the remote device power supply units connected to the wake-up signal feeding line 6.

The steps of the waking-up method can be described in three cases:

Case 1: the remote device power supply units connected to the wake-up signal feeding line 6 are waken up instantly when a wake-up signal is received. The specific method for waking-up comprises three steps.

(1) When the remote device power supply units in sleep state are required to be waken up into normal operating state, the wake-up signal generator unit 4A will generate a DC voltage pulse code with reversed polarity as the wake-up signal as instructed by an external control signal inputted from the wake-up control port G, and send the wake-up signal to the remote device power supply units through the wake-up signal feeding line 6.

(2) After the remote device power supply units receive the wake-up signal, on one hand, the wake-up signal detection module will detect and confirm the received signal is the specified wake-up signal, and then enable the controllable power supply module to operate normally; on the other hand, the wake-up signal feeding line 6 will be used as the power input cable of the controllable power supply module to obtain electric power, or obtain the electric power directly from the local power input port $V_L$, and generate supply voltage output required by the remote devices after transforming, so as to wake up the remote devices from power-off state.

(3) The wake-up signal generator unit 4A is informed that the remote device has been waken up successfully by detecting that the current in the wake-up signal feeding line 6 is higher than the predetermined threshold value, and outputs a confirmation signal to the control center via the remote state output port S.

Case 2: said wake-up signal generator unit 4A can generate a variety of different wake-up signals, and thereby can select and designate a specific remote device power supply unit to be waken up. Since the wake-up signal generator module 432 comprises the intelligent pulse encoding module 4321, it can generate different DC voltage pulse codes with reversed polarity on the basis of given rules according to the different inputted external control signal.

In this case, a plurality of remote device power supply units can be connected in parallel to the wake-up signal feeding line 6, and can be waken up separately by the wake-up signal generator unit 4A that serves as a control center by means of designating different wake-up signals. The specific method for waking-up comprises the following three steps.

(1) When said remote device power supply units are in sleep state and there is no supply voltage output required for normal operation of the remote devices, said wake-up signal generator unit 4A will selectively generate a specific wake-up signal as instructed by the external control signal inputted from the wake-up control port G, and send the wake-up signal through the wake-up signal feeding line 6 to said remote device power supply units. Said specific wake-up signal is one of said different DC voltage pulse codes with reversed polarity.

(2) After said remote device power supply unit in sleep state correctly identifies the arriving specific wake-up signal, it will wake up said remote device power supply unit to operate normally, and generate and output supply voltage required for the normal operation of the remote device, so as to wake up the remote device from power-off state.

(3) The wake-up signal generator unit 4A is informed that the remote device has been waken up successfully by detecting that the current in the wake-up signal feeding line 6 is higher than the predetermined threshold value, and outputs a confirmation signal to the control center via the remote state output port S.

Case 3: a plurality of remote device power supply units may be connected in parallel to the wake-up signal feeding line 6, but the system does not permit two or more remote device power supply units to power on and operate at the same time.

In this case, an occupation signal and additional steps are required to wake up the remote device power supply unit. The specific method for waking-up comprises the following eight steps.

(1) The wake-up signal generator unit 4A confirms that all remote device power supply units connected to the wake-up signal feeding line are in sleep state by detecting that the current in the wake-up signal feeding line 6 is lower than a predetermined threshold value and only a normal state signal exists in the wake-up signal feeding line 6.

(2) The wake-up signal generator unit 4A generates a wake-up signal and outputs the wake-up signal to the wake-up signal feeding line 6.

(3) The remote device power supply unit detects a wake-up signal in the wake-up signal feeding line 6, and continues waiting, till the wake-up signal disappears and a normal state signal occurs again in the wake-up signal feeding line 6.

(4) The wake-up signal generator unit 4A sends a normal state signal again after it sends the wake-up signal. The remote device power supply unit will continue waiting for a random period further, after it detects a normal state signal in the wake-up signal feeding line 6.

(5) If an occupation signal is detected from the wake-up feeding line port 62 during the delayed waiting period of time, the remote device power supply unit will freeze the waking-up operation, and terminate the waking-up process till the normal state signal is sent again through the wake-up signal feeding line, and continue keeping in sleep state.

(6) If no occupation signal is detected from the wake-up signal feeding line 6 during the delayed waiting period of time, the remote device power supply unit will output normal supply voltage, so as to wake up the remote device from sleep state into normal operating state.

(7) The wake-up signal generator unit 4A is informed that the remote device has been waken up successfully by detecting that the current in the wake-up signal feeding line 6 is higher than the predetermined threshold value, and outputs a confirmation signal to the control center via the remote state output port S.

(8) After the wake-up signal generator unit 4A judges that the remote device is already in wake-up state, it will generate an occupation signal and output the occupation signal to the wake-up signal feeding line 6.

When the remote device is to be waken up itself, the remote device power supply unit will wake up said remote device power supply unit in sleep state through three steps:

(1) If the remote device power supply unit detects a normal state signal from the wake-up feeding line port 62, it will output normal supply voltage, so as to wake up the remote device from sleep state into normal operating state.

(2) If the remote device power supply unit detects an occupation signal from the wake-up feeding line port 62, it will freeze the waking-up operation, till a normal state signal is sent again from the wake-up signal feeding line 6; then, the remote device power supply unit will wait for a random delay period of time, and then restart the self-wake-up process from step (1).

(3) After the wake-up signal generator unit 4A judges that the remote device is already in wake-up state, it will generate an occupation signal and output the occupation signal to the wake-up signal feeding line 6.

Embodiment 3

This embodiment provides remote waking-up system and method that utilize voltage with different amplitude as the wake-up signal.

In this embodiment, as shown in FIG. 20, the remote waking-up system comprises: a wake-up signal generator unit 4B, a remote device power supply unit 5B, and a wake-up signal feeding line 6 that connects the wake-up signal generator unit 4B and the remote device power supply unit 5B. The wake-up signal generator unit 4B comprises: a power supply input port $V_B$, a wake-up control port G, a remote device state output port S, a feeding line output port 61, a power supply module 41, a current detection module 42, and a wake-up signal generator module 43B. The remote device power supply unit 5B comprises: a wake-up feeding line port 62, a wake-up signal detection module 53B, a controllable power supply module 51, and a supply voltage output port V.

Said wake-up signal generator module 43B outputs a voltage wake-up signal with amplitude different to the amplitude of the normal state signal to the feeding line output port 61, according to the signal indication from the wake-up control port G. The wake-up signal generator module 43B can be implemented with a DPDT K1 or a relay. As shown in FIG. 21, the wake-up signal generator module 433 comprises a DPDT switch K1; the input voltage V4 and V5 represent DC voltage or AC voltage with different amplitudes respectively, wherein, V4 represents the voltage for normal state signal, and V5 represents the voltage for wake-up signal. The normal state signal or wake-up signal can be generated and outputted simply by switching the DPDT switch K1 as instructed by an external control signal indication.

The occupation signal is defined as DC or AC voltage with amplitude different to the amplitude of the normal state signal. The wake-up signal generator module 43B is further required to generate and output an occupation signal when it receives an external control signal.

Said wake-up signal detection module 53B can generate and output wake-up indication when it detects a wake-up signal, so that the controllable power supply module 51 can obtain electric power and enter into normal operating state, and thereby output steady supply voltage to the local device.

In the case that said wake-up signal is DC voltage with amplitude different to the amplitude of the normal state signal, the wake-up signal detection module 53B can be implemented with the wake-up signal detection module 535 shown in FIG. 22. Suppose that the voltage for normal state signal is lower, and the voltage for wake-up signal is higher. Then, the regulate voltage value through the voltage regulator diodes D5 and D6 and the resistance value of current limiting resistors R6 and R7 can be designed reasonably, so that the comparator module 5351 outputs high-level voltage that can be used as an enabled signal for controlling the controllable power supply module 51 when a wake-up signal appears.

In the case that said wake-up signal is AC voltage with amplitude different to the amplitude of the normal state signal, the arriving signal can be rectified first, and then the wake-up signal detection module 535 shown in FIG. 22 can be used to detect the rectified signal. When said wake-up signal detection module 535 detects a wake-up signal, it will output a wake-up indication signal as an enabled signal for controlling the controllable power supply module 51 accordingly.

Alternatively, the wake-up signal detection module 53 can also be implemented with the wake-up signal detection module 536 with memory function shown in FIG. 23. The wake-up signal detection module 536 comprises a conventional wake-up signal detection module 5361 and an intelligent processing module 5362. Said conventional wake-up signal detection module 5361 can be the wake-up signal detection module 535 that detects the amplitude of DC voltage, or a wake-up signal detection module that detects the amplitude of AC voltage shown in FIG. 22. The intelligent processing module 5362 can be designed with pure digital logic components, or implemented with a FPGA, or implemented with an intelligent chip, such as the singlechip 51 or an ARM embedded intelligent chip. After the conventional wake-up signal detection module 5361 detects a wake-up signal and outputs signal indication, the intelligent processing module 5362 can keep the wake-up signal in memory for a period of time and output persistently within the valid memory period.

In initial state, all remote device power supply units are in sleep state, the wake-up signal generator unit 4B outputs normal state signal, and the wake-up signal feeding line 6 has no current; therefore, the wake-up signal generator unit 4B detects that the current in the wake-up signal feeding line 6 is lower than the preset threshold value, and judges that the remote device is in sleep state, and outputs the state signal via the remote device state output port S.

The wake-up signal generator module 4B can generate a voltage wake-up signal with amplitude different to the amplitude of the normal state signal, to wake up the remote device power supply units connected to the wake-up signal feeding line 6. There are two cases:

Case 1: all remote device power supply units connected to the wake-up signal feeding line 6 are waken up instantly when a wake-up signal is received. That process can be accomplished through three steps.

(1) When the remote device power supply units in sleep state are required to be waken up into normal operating state, the wake-up signal generator unit 4B will generate a voltage wake-up signal with amplitude different to the amplitude of the normal state signal as instructed by an external control signal inputted from the wake-up control port G, and send the wake-up signal to the remote device power supply units through the wake-up signal feeding line 6.

(2) After the remote device power supply units receive the wake-up signal, on one hand, the wake-up signal detection module will detect and confirm the received signal is the specified wake-up signal, and then enable the controllable power supply module to operate normally; on the other hand, the wake-up signal feeding line 6 will be used as the power input cable of the controllable power supply module to obtain electric power, or obtain the electric power directly from the local power input port, and generate supply voltage output required for the remote devices after transforming, so as to wake up the remote devices from power-off state.

(3) The wake-up signal generator unit 4B is informed that the remote device has been waken up successfully by detecting that the current in the wake-up signal feeding line 6 is higher than the predetermined threshold value, and outputs a confirmation signal to the control center via the remote device state output port S.

Case 2: when a plurality of remote device power supply units connected to the wake-up signal feeding line 6 receive a wake-up signal, any one of the remote device power supply units is waken up, and it is forbidden that two or more remote device power supply units operate at the same time.

The Case 2 of this embodiment can be accomplished through the following eight steps.

(1) The wake-up signal generator unit 4B confirms that all remote device power supply units connected to the wake-up signal feeding line 6 are in sleep state by detecting that the current in the wake-up signal feeding line 6 is lower than a predetermined threshold value and only a normal state signal exists in the wake-up signal feeding line 6.

(2) The wake-up signal generator unit 4B generates a wake-up signal and outputs the wake-up signal to the wake-up signal feeding line 6.

(3) The remote device power supply unit detects the wake-up signal in the wake-up signal feeding line 6, initiates the waking-up procedure of waiting for a normal state signal, and detects the voltage signal in the wake-up signal feeding line 6 and waits, till a normal state signal is detected.

(4) The wake-up signal generator unit 4B sends a normal state signal again after it sends the wake-up signal. The remote device power supply unit will continue waiting for a random period further, after it detects a normal state signal in the wake-up signal feeding line 6.

(5) If an occupation signal is detected from the wake-up feeding line port 62 during the delayed waiting period of time, the remote device power supply unit will freeze the waking-up operation, and terminate the waking-up process till the normal state signal is sent again through the wake-up signal feeding line 6, and continue keeping in sleep state.

(6) If no occupation signal is detected from the wake-up signal feeding line 6 during the delayed waiting period of time, the remote device power supply unit will output normal supply voltage, so as to wake up the remote device from sleep state into normal operating state.

(7) The wake-up signal generator unit 4B is informed that the remote device has been waken up successfully by detecting that the current in the wake-up signal feeding line 6 is higher than the predetermined threshold value, and outputs a confirmation signal to the control center via the remote device state output port S.

(8) After the wake-up signal generator unit 4B judges that the remote device is already in wake-up state, it will generate an occupation signal and output the occupation signal to the wake-up signal feeding line 6.

When the remote device is to wake up itself, the remote device power supply unit will wake up said remote device power supply unit in sleep state through three steps:

(1) If the remote device power supply unit detects a normal state signal from the wake-up feeding line port 62, it will output normal supply voltage, so as to wake up the remote device from sleep state into normal operating state.

(2) If the remote device power supply unit detects an occupation signal from the wake-up feeding line port 62, it will freeze the waking-up operation, till a normal state signal is sent again from the wake-up signal feeding line 6; then, the remote device power supply unit will wait for a random delay period of time, and then restart the self-wake-up process from step (1).

(3) After the wake-up signal generator unit 4B judges that the remote device is already in wake-up state, it will generate an occupation signal and output the occupation signal to the wake-up signal feeding line 6.

Embodiment 4

This embodiment provides remote waking-up system and method that utilize voltage pulse codes with different amplitude as the wake-up signal.

In this embodiment, as shown in FIG. 24, the remote waking-up system comprises: a wake-up signal generator unit 4C, a remote device power supply unit 5C, and a wake-up signal feeding line 6 that connects the wake-up signal generator unit 4C and the remote device power supply unit 5C. The wake-up signal generator unit 4C comprises: a power supply input port $V_B$, a wake-up control port G, a remote device state output port S, a feeding line output port 61, a power supply module 41, a current detection module 42, and a wake-up signal generator module 43C. The remote device power supply unit 5C comprises: a wake-up feeding line port 62, a wake-up signal detection module 53C, a controllable power supply module 51, and a supply voltage output port V.

Said wake-up signal generator module 43C outputs a voltage pulse code with amplitude different to the amplitude of the normal state signal to the feeding line output port 61 on the basis of given rules, according to the signal indication from the wake-up control port G. If the indication signal sent from the wake-up control port G is a voltage pulse in itself, it can be implemented with the wake-up signal generator module 433 shown in FIG. 21, according to the method identical to the implementation scheme in which the wake-up signal is voltage with amplitude different to the amplitude of the normal state signal. If the wake-up indication signal is DC voltage or certain digital code but a voltage pulse code must be outputted, it can be implemented with the wake-up signal generator module 434 shown in FIG. 25.

The wake-up signal generator module 434 comprises an intelligent pulse encoding module 4341 and a DPDT switch K1; V6 represents the voltage for normal state signal, and V7 represents the voltage with amplitude different to the amplitude of the normal state voltage. The intelligent pulse encoding module 4341 can be designed with pure digital logic components, or can be implemented with an intelligent chip, such as a 51 singlechip, or ARM embedded system, or FPGA, etc. After the intelligent pulse encoding module 4341 receives an external control signal, it will output the corresponding DC voltage pulse control waveform signal to control the DPDT switch K1 to switch over, so as to control the wake-up signal generator module 434 to output a specified voltage pulse code.

The occupation signal is defined as a voltage pulse with amplitude different to the amplitude of the normal state signal. The wake-up signal generator module 43C is also required to generate and output an occupation signal when it receives a specific external control signal.

Said wake-up signal detection module 53C can be implemented with the wake-up signal detection module 537 shown in FIG. 26.

The wake-up signal detection module 537 comprises a voltage amplitude detection module 5371 and an intelligent processing module 5372. The voltage amplitude detection module 5371 can be implemented with the wake-up signal detection module 535 that detects the amplitude of DC voltage, or a wake-up signal detection module that detects the amplitude of AC voltage shown in FIG. 22.

The intelligent processing module 5372 can be designed with pure digital logic components, or implemented with a FPGA, or implemented with an intelligent chip, such as the singlechip 51 or an ARM embedded intelligent chip.

After the intelligent processing module 5372 receives voltage amplitude indication from the voltage polarity detection module 5371, it will keep the voltage polarity indication in memory, compare and judge whether the received voltage pulse signal with specific amplitude is the specified voltage pulse code, and persistently output a wake-up indication signal when the correct voltage pulse code is received.

The wake-up signal detection module 537 can have a plurality of wake-up indication signal output ports to control a plurality of controllable power supply modules.

In initial state, all remote device power supply units are in sleep state, the wake-up signal generator unit 4C outputs normal state signal, and the wake-up signal feeding line 6 has no current; therefore, the wake-up signal generator unit 4C detects that the current in the wake-up signal feeding line 6 is lower than the preset threshold value, and judges that the remote device is in sleep state, and outputs the state signal via the remote device state output port S.

The wake-up signal generator unit 4C can generate a voltage pulse code wake-up signal with amplitude different to the amplitude of the normal state signal, to wake up a remote device power supply units connected to the wake-up signal feeding line 6.

The steps of the waking-up method can be described in three cases:

Case 1: the remote device power supply units connected to the wake-up signal feeding line 6 are waken up instantly when a wake-up signal is received. The specific method for waking-up comprises three steps.

(1) When the remote device power supply units in sleep state are required to be waken up into normal operating state, the wake-up signal generator unit 4C will generate a voltage pulse code with amplitude different to the amplitude of the normal state signal as the wake-up signal as instructed by an external control signal inputted from the wake-up control port G, and send the wake-up signal to the remote device power supply units through the wake-up signal feeding line 6.
(2) After the remote device power supply units receive the wake-up signal, on one hand, the wake-up signal detection module will detect and confirm the received signal is the specified wake-up signal, and then enable the controllable power supply module to operate normally; on the other hand, the wake-up signal feeding line 6 will be used as the power input cable of the controllable power supply module to obtain electric power, or obtain the electric power directly from the local power input port $V_L$, and generate supply voltage output required for the remote devices after transforming, so as to wake up the remote devices from power-off state.
(3) The wake-up signal generator unit 4C is informed that the remote device has been waken up successfully by detecting that the current in the wake-up signal feeding line 6 is higher than the predetermined threshold value, and outputs a confirmation signal to the control center via the remote device state output port S.

Case 2: said wake-up signal generator unit 4C can generate a variety of different wake-up signals, and thereby can select and designate a specific remote device power supply unit to be waken up. Since the wake-up signal generator module 434 comprises the intelligent pulse encoding module 4341, it can generate different voltage pulse codes with amplitude different to the amplitude of the normal state signal on the basis of specified rules according to different external control signals.

In this case, a plurality of remote device power supply units can be connected in parallel to the wake-up signal feeding line 6, and can be waken up separately by the wake-up signal generator unit 4C that serves as a control center by means of designating different wake-up signals. The specific method for waking-up comprises the following three steps.
(1) When said remote device power supply units are in sleep state and there is no supply voltage output required for normal operation of the remote devices, said wake-up signal generator unit 4C will selectively generate a specific wake-up signal as instructed by the external control signal inputted from the wake-up control port G, and send the wake-up signal to the remote device power supply units through the wake-up signal feeding line 6. Said specific wake-up signal is one of said voltage pulse codes with amplitude different to the amplitude of the normal state signal.
(2) After said remote device power supply unit in sleep state correctly identifies the arriving specific wake-up signal, it will wake up said remote device power supply unit to operate normally, generate and output supply voltage required for the normal operation of the remote device, so as to wake up the remote device from power-off state.
(3) The wake-up signal generator unit 4C is informed that the remote device has been waken up successfully by detecting that the current in the wake-up signal feeding line 6 is higher than the predetermined threshold value, and outputs a confirmation signal to the control center via the remote device state output port S.

Case 3: a plurality of remote device power supply units may be connected in parallel to the wake-up signal feeding line 6, but the system does not permit two or more remote device power supply units to power on and operate at the same time.

In this case, an occupation signal and additional steps are required to wake up the remote device power supply unit. The specific method for waking-up comprises the following eight steps.
(1) The wake-up signal generator unit 4C confirms that all remote device power supply units connected to the wake-up signal feeding line 6 are in sleep state by detecting that the current in the wake-up signal feeding line 6 is lower than a predetermined threshold value and only a normal state signal exists in the wake-up signal feeding line 6.
(2) The wake-up signal generator unit 4C generates a wake-up signal and outputs the wake-up signal to the wake-up signal feeding line 6.
(3) The remote device power supply unit detects a wake-up signal in the wake-up signal feeding line 6, and continues waiting, till the wake-up signal disappears and a normal state signal occurs again in the wake-up signal feeding line 6.
(4) The wake-up signal generator unit 4C sends a normal state signal again after it sends the wake-up signal. The remote device power supply unit will continue waiting for a random period of time further, after it detects a normal state signal in the wake-up signal feeding line 6.
(5) If an occupation signal is detected from the wake-up feeding line port 62 during the delayed waiting period, the remote device power supply unit will freeze the waking-up operation, and terminate the waking-up process till the normal state signal is sent again through the wake-up signal feeding line 6, and continue keeping in sleep state.
(6) If no occupation signal is detected from the wake-up signal feeding line 6 during the delayed waiting period, the remote device power supply unit will output normal supply voltage, so as to wake up the remote device from sleep state into normal operating state.
(7) The wake-up signal generator unit 4C is informed that the remote device has been waken up successfully by detecting that the current in the wake-up signal feeding line 6 is higher than the predetermined threshold value, and outputs a confirmation signal to the control center via the remote device state output port S.
(8) After the wake-up signal generator unit 4C judges that the remote device is already in wake-up state, it will generate an occupation signal and output the occupation signal to the wake-up signal feeding line 6.

When the remote device is to wake up itself, the remote device power supply unit will wake up said remote device power supply unit in sleep state through three steps:
(1) If the remote device power supply unit detects a normal state signal from the wake-up feeding line port 62, it will output normal supply voltage, so as to wake up the remote device from sleep state into normal operating state.
(2) If the remote device power supply unit detects an occupation signal from the wake-up feeding line port 62, it will freeze the waking-up operation, till a normal state signal is sent again from the wake-up signal feeding line 6; then, the remote device power supply unit will wait for a random delay period of time, and then restart the self-wake-up process from step (1).
(3) After the wake-up signal generator unit 4C judges that the remote device is already in wake-up state, it will generate an occupation signal and output the occupation signal to the wake-up signal feeding line 6.

Embodiment 5

This embodiment provides remote waking-up system and method that utilize a DC voltage or DC voltage pulse code with a specified frequency or frequency range as a wake-up signal.

In this embodiment, as shown in FIG. 27, the remote waking-up system comprises: a wake-up signal generator unit 4D, a remote device power supply unit 5D, and a wake-up signal feeding line 6 that connects the wake-up signal generator unit 4D and the remote device power supply unit 5D. The wake-up signal generator unit 4D comprises: a power supply input port $V_B$, a wake-up control port G, a remote device state output port S, a feeding line output port 61, a power supply module 41, a current detection module 42, and a wake-up signal generator module 43D. The remote device power supply unit 5D comprises: a wake-up feeding line port 62, a wake-up signal detection module 53D, a controllable power supply module 51, and a supply voltage output port V.

Said wake-up signal generator module 43D outputs AC voltage wake-up signals with a combination of different frequency codes to the feeding line output port 61 on the basis of given rules, according to the signal indication from the wake-up control port G.

The wake-up signal generator module 43D can be implemented with the wake-up signal generator module 435 shown in FIG. 28. The wake-up signal generator module 435 comprises an intelligent encoding module 4351, a DPDT switch K1, and two AC signal generators 4352 and 4353 that generate AC voltage with different frequencies. The AC signal generator 4352 is designed to generate a normal state signal with specified frequency. The intelligent encoding module 4351 can be designed with pure digital logic components, or can be implemented with an intelligent chip, such as a 51 singlechip, or ARM embedded system, or FPGA, etc. After the intelligent encoding module 4351 receives an external control signal, it will output the corresponding DC voltage or DC voltage pulse control waveform signal to control the DPDT switch K1 to switch over, so as to control the wake-up signal generator module 435 to output a AC voltage wake-up signal with a combination of frequency codes on the basis of specified rules.

In a preferred embodiment, the normal state signal is selected as AC voltage with a specific frequency. Actually, DC voltage is more often used as the normal state signal, and AC voltage with a specified frequency or frequency range is superposed on the DC normal state signal as a wake-up signal. In this case, the wake-up signal generator module 436 shown in FIG. 29 can be used.

The wake-up signal generator module 436 comprises an intelligent encoding module 4361, a DPDT switch K1, an AC signal generator 4362, and coupling transformers 4363 and 4364. V8 represents the DC voltage in normal state. The AC signal generator 4362 generates an AC voltage signal with a specified frequency or frequency range for waking-up. The intelligent encoding module 4361 can be designed with pure digital logic components, or can be implemented with an intelligent chip, such as a 51 singlechip, or ARM embedded system, or FPGA, etc. After the intelligent encoding module 4361 receives an external control signal, it will output the corresponding DC voltage or DC voltage pulse control waveform signal to control the DPDT switch K1 to switch over, so as to superpose the AC voltage signal with a specific frequency or frequency range generated by the AC signal generator 4362 on the DC voltage signal in normal state and output the superposed voltage.

The occupation signal is defined as AC voltage or an AC voltage pulse with frequency different to the frequency of the normal state signal. The wake-up signal generator module 43D is also required to generate and output an occupation signal when it receives a specific external control signal.

Said wake-up signal detection module 53D can generate and output wake-up indication when it detects a wake-up signal, so that the controllable power supply module 51 can obtain electric power and enter into normal operating state, and thereby output steady supply voltage to the local device.

The wake-up signal detection module 53D can be implemented with the wake-up signal detection module 538 shown in FIG. 30. The wake-up signal detection module 538 comprises a resonance filter module 5381, a detected output module 5382, and an intelligent processing module 5383. The resonance filter module 5351 can be an inductance-capacitance resonance circuit, and can also be a low-pass or high-pass filter module, depending on whether the frequency of the wake-up signal is higher than the frequency of the normal state signal or lower than the frequency of the normal state signal. The detected output module 5382 is also available in a variety of options different to the module shown in FIG. 26, such as full-wave rectifier, half-wave detection, and voltage-doubler rectifier, etc. Please see textbooks for the details.

The intelligent processing module 5383 can be designed with pure digital logic components, or implemented with a FPGA, or implemented with an intelligent chip, such as the singlechip 51 or an ARM embedded intelligent chip.

After the intelligent processing module 5383 receives voltage frequency indication from the detected output module 5382, it will keep the voltage frequency indication in memory, compare and judge whether the received voltage signal is the combination of specified frequency codes, and persistently output a wake-up indication signal when AC voltage with the correct combination of frequency codes is received.

The wake-up signal detection module 538 can have a plurality of wake-up indication signal output ports to control a plurality of controllable power supply modules.

In initial state, all remote device power supply units are in sleep state, the wake-up signal generator unit 4D outputs normal state signal, and the wake-up signal feeding line 6 has no current; therefore, the wake-up signal generator unit 4D detects that the current in the wake-up signal feeding line 6 is lower than the preset threshold, and judges that the remote device is in sleep state, and outputs the state signal via the remote device state output port S.

The wake-up signal generator unit 4D can generate AC voltage wake-up signals with different combinations of frequency codes to wake up remote device power supply units connected to the wake-up signal feeding line 6.

The steps of the waking-up method can be described in three cases:

Case 1: the remote device power supply units connected to the wake-up signal feeding line 6 will be waken up instantly when a wake-up signal is received. The specific method for waking-up comprises three steps.

(1) When the remote device power supply units in sleep state are required to be waken up into normal operating state, the wake-up signal generator unit 4D will generate AC voltage with a combination of different frequency codes as a wake-up signal as instructed by an external control signal inputted from the wake-up control port G, and send the wake-up signal to the remote device power supply units through the wake-up signal feeding line 6.

(2) After the remote device power supply unit receives the wake-up signal, on one hand, the wake-up signal detection module will detect and confirm the received signal is the specified wake-up signal, and then enable the controllable power supply module to operate normally; on the other hand, the wake-up signal feeding line 6 will be used as the power input cable of the controllable power supply module to obtain electric power, or obtain the electric power directly from the local power input port $V_L$, and generate supply voltage output required for the remote device after transforming, so as to wake up the remote device from power-off state.

(3) The wake-up signal generator unit 4D is informed that the remote device has been waken up successfully by detecting that the current in the wake-up signal feeding line 6 is higher than the predetermined threshold value, and outputs a confirmation signal to the control center via the remote device state output port S.

Case 2: said wake-up signal generator unit 4D can generate a variety of different wake-up signals, and thereby can select and designate a specific remote device power supply unit to be waken up. Both the wake-up signal generator module 435 and the wake-up signal generator module 436 comprise an intelligent encoding module; therefore, different AC voltage with a combination of different frequency codes can be generated on the basis of specified rules according to different external control signals.

In this case, a plurality of remote device power supply units can be connected in parallel to the wake-up signal feeding line 6, and can be waken up separately by the wake-up signal generator unit 4D that serves as a control center by means of designating different wake-up signal. The specific method for waking-up comprises the following three steps.

(1) When said remote device power supply unit is in sleep state and there is no supply voltage output required for normal operation of the remote devices, said wake-up signal generator unit 4D will selectively generate a specific wake-up signal as instructed by the external control signal inputted from the wake-up control port G, and send the wake-up signal to the remote device power supply unit through the wake-up signal feeding line 6. Said specific wake-up signal is one of said AC voltage wake-up signals with a combination of specified frequency codes.

(2) After said remote device power supply unit in sleep state correctly identifies the arriving specific wake-up signal, it will wake up said remote device power supply unit to operate normally, and generate and output supply voltage required for the normal operation of the remote device, so as to wake up the remote device from power-off state.

(3) The wake-up signal generator unit 4D is informed that the remote device has been waken up successfully by detecting that the current in the wake-up signal feeding line 6 is higher than the predetermined threshold value, and outputs a confirmation signal to the control center via the remote device state output port S.

Case 3: a plurality of remote device power supply units may be connected in parallel to the wake-up signal feeding line 6, but the system does not permit two or more remote device power supply units to power on and operate at the same time.

In this case, an occupation signal and additional steps are required to wake up the remote device power supply unit. The specific method for waking-up comprises the following eight steps.

(1) The wake-up signal generator unit 4D confirms that all remote device power supply units connected to the wake-up signal feeding line 6 are in sleep state by detecting that the current in the wake-up signal feeding line 6 is lower than a predetermined threshold value and only a normal state signal exists in the wake-up signal feeding line 6.

(2) The wake-up signal generator unit 4D generates a wake-up signal and outputs the wake-up signal to the wake-up signal feeding line 6.

(3) The remote device power supply unit detects a wake-up signal in the wake-up signal feeding line 6, and keeps on waiting, till the wake-up signal disappears and a normal state signal occurs again in the wake-up signal feeding line 6.

(4) The wake-up signal generator unit 4D sends a normal state signal again after it sends the wake-up signal. The remote device power supply unit will continue waiting for a random period of time further, after it detects a normal state signal in the wake-up signal feeding line 6.

(5) If an occupation signal is detected from the wake-up feeding line port 62 during the delayed waiting period, the remote device power supply unit will freeze the waking-up operation, and terminate the waking-up process till the normal state signal is sent again through the wake-up signal feeding line 6, and continue keeping in sleep state.

(6) If no occupation signal is detected from the wake-up signal feeding line 6 during the delayed waiting period, the remote device power supply unit will output normal supply voltage, so as to wake up the remote device from sleep state into normal operating state.

(7) The wake-up signal generator unit 4D is informed that the remote device has been waken up successfully by detecting that the current in the wake-up signal feeding line 6 is higher than the predetermined threshold value, and outputs a confirmation signal to the control center via the remote device state output port S.

(8) After the wake-up signal generator unit 4D judges that the remote device is already in wake-up state, it will generate an occupation signal and output the occupation signal to the wake-up signal feeding line 6.

When the remote device is to wake up itself, the remote device power supply unit will wake up said remote device power supply unit in sleep state through three steps:

(1) If the remote device power supply unit detects a normal state signal from the wake-up feeding line port 62, it will output normal supply voltage, so as to wake up the remote device from sleep state into normal operating state.

(2) If the remote device power supply unit detects an occupation signal from the wake-up feeding line port 62, it will freeze the waking-up operation, till a normal state signal is sent again from the wake-up signal feeding line 6; then, the remote device power supply unit will wait for a random delay period, and then restart the self-wake-up process from step (1).

(3) After the wake-up signal generator unit judges that the remote device is already in wake-up state, it will generate an occupation signal and output the occupation signal to the wake-up signal feeding line 6.

Embodiment 6

This embodiment provides remote waking-up system and method that utilize AC voltage or AC voltage pulse codes with different phases as wake-up signals.

In this embodiment, as shown in FIG. 31, the remote waking-up system comprises: a wake-up signal generator unit 4E, a remote device power supply unit 5E, and a wake-up signal feeding line 6 that connects the wake-up signal generator unit 4E and the remote device power supply unit 5E. The wake-up signal generator unit 4E comprises: a power supply input port $V_B$, a wake-up control port G, a remote device state output port S, a feeding line output port 61, a power supply module 41, a current detection module 42, and a wake-up signal generator module 43E. The remote device power supply unit 5E comprises: a wake-up feeding line port 62, a wake-up signal detection module 53E, a controllable power supply module 51, and a supply voltage output port V.

Said wake-up signal generator module 43E outputs an AC voltage or AC voltage pulse code with phase different to the phase of the normal state signal to the feeding line output port 61 on the basis of specified rules, according to the signal indication from the wake-up control port G. The wake-up signal generator module 43E can be implemented with the wake-up signal generator module 437 shown in FIG. 32. The wake-up signal generator module 437 comprises a phase modulation module 4371, an intelligent encoding module 4372, and a DPDT switch K1. The phase modulation module 4371 can be implemented simply with a single resonance circuit constituted by a variable-capacitance diode and an inductor, and can also be implemented with a proven commercial chip.

The intelligent encoding module 4372 can be designed with pure digital logic components, or can be implemented with an intelligent chip, such as a 51 singlechip, or ARM embedded system, or FPGA. After the intelligent encoding module 4372 receives an external control signal, it will output the corresponding DC voltage or DC voltage pulse control waveform signal to control the DPDT switch K1 to switch over, so as to control the wake-up signal generator module 437 to output a AC voltage or AC voltage pulse code wake-up signal with phase different to the phase of the normal state.

The occupation signal is defined as an AC voltage value or AC voltage pulse with phase different to the phase of the normal state signal. The wake-up signal generator module 43A is also required to generate and output an occupation signal when it receives a specific external control signal.

Said wake-up signal detection module 53E can generate and output wake-up indication when it detects a wake-up signal, so that the controllable power supply module 51 can obtain electric power and enter into normal operating state, and thereby output steady supply voltage to the local device.

The wake-up signal detection module 53E can be implemented with the wake-up signal detection module 539 shown in FIG. 33. The wake-up signal detection module 539 comprises a phase detection module 5391 and an intelligent processing module 5392.

The intelligent processing module 5392 can be designed with pure digital logic components, or implemented with a FPGA, or implemented with an intelligent chip, such as a singlechip 51 or an ARM embedded intelligent chip.

After the intelligent processing module 5392 receives phase indication from the phase detection module 5391, it will keep the phase indication in memory, compare and judge whether the received AC signal is the specified AC voltage or AC voltage pulse code, and persistently output a wake-up indication signal when correct AC voltage or AC Voltage pulse code is received.

The wake-up signal detection module 539 can have a plurality of wake-up indication signal output ports to control a plurality of controllable power supply modules.

In initial state, all remote device power supply units are in sleep state, the wake-up signal generator unit 4E outputs normal state signal, and the wake-up signal feeding line 6 has no current; therefore, the wake-up signal generator unit 4E detects that the current in the wake-up signal feeding line 6 is lower than the preset threshold, and judges that the remote device is in sleep state, and outputs the state signal via the remote device state output port S.

The wake-up signal generator unit 4E can generate an AC voltage or AC voltage pulse code wake-up signal with phase different to the phase of the normal state signal, to wake up the remote device power supply unit connected to the wake-up signal feeding line 6.

The steps of the waking-up method can be described in three cases:

Case 1: the remote device power supply units connected to the wake-up signal feeding line 6 will be waken up instantly when a wake-up signal is received. The specific method for waking-up comprises three steps.

(1) When the remote device power supply units in sleep state are required to be waken up into normal operating state, the wake-up signal generator unit 4E will generate AC voltage or AC voltage pulse code with phase different to the phase of the normal state signal as the wake-up signal as instructed by an external control signal inputted from the wake-up control port G, and send the wake-up signal to the remote device power supply units through the wake-up signal feeding line 6.

(2) After the remote device power supply unit receives the wake-up signal, on one hand, the wake-up signal detection module will detect and confirm the received signal is the specified wake-up signal, and then enable the controllable power supply module to operate normally; on the other hand, the wake-up signal feeding line 6 will be used as the power input cable of the controllable power supply module to obtain electric power, or obtain the electric power directly from the local power input port $V_L$, and generate supply voltage output required for the remote device after transforming, so as to wake up the remote device from power-off state.

(3) The wake-up signal generator unit 4E is informed that the remote device has been waken up successfully by detecting that the current in the wake-up signal feeding line 6 is higher than the predetermined threshold value, and outputs a confirmation signal to the control center via the remote device state output port S.

Case 2: said wake-up signal generator unit 4E can generate a variety of different wake-up signals, and thereby can select and designate a specific remote device power supply unit to be waken up. Since the wake-up signal generator module 437 comprises the intelligent encoding module 4372, it can generate different AC voltage pulse codes with phase different to the phase of the normal state on the basis of specified rules according to different external control signals.

In that case, a plurality of remote device power supply units can be connected in parallel to the wake-up signal feeding line 6, and can be waken up separately by the wake-up signal generator unit 4E that serves as a control center by means of designating different wake-up signals. The specific method for waking-up comprises the following three steps.

(1) When said remote device power supply units are in sleep state and there is no supply voltage output required for normal operation of the remote devices, said wake-up signal generator unit 4E will selectively generate a specific wake-up signal as instructed by the external control signal inputted from the wake-up control port G, and send the wake-up signal to the remote device power supply units through the wake-up signal feeding line 6. Said specific wake-up signal is one of the AC voltage pulse codes with different phases.

(2) After said remote device power supply unit in sleep state correctly identifies the arriving specific wake-up signal, it will wake up said remote device power supply unit to operate normally, and generate and output supply voltage required for the normal operation of the remote device, so as to wake up the remote device from power-off state.

(3) The wake-up signal generator unit 4E is informed that the remote device has been waken up successfully by detecting that the current in the wake-up signal feeding line 6 is higher than the predetermined threshold value, and outputs a confirmation signal to the control center via the remote device state output port S.

Case 3: a plurality of remote device power supply units may be connected in parallel to the wake-up signal feeding line 6, but the system does not permit two or more remote device power supply units to power on and operate at the same time.

In that case, an occupation signal and additional steps are required to wake up the remote device power supply unit. The specific method for waking-up comprises the following eight steps.

(1) The wake-up signal generator unit 4E confirms that all remote device power supply units connected to the wake-up signal feeding line 6 are in sleep state by detecting that the current in the wake-up signal feeding line 6 is lower than a predetermined threshold value and only a normal state signal exists in the wake-up signal feeding line 6.

(2) The wake-up signal generator unit 4E generates a wake-up signal and outputs the wake-up signal to the wake-up signal feeding line 6.

(3) The remote device power supply unit detects a wake-up signal in the wake-up signal feeding line 6, and keeps on waiting, till the wake-up signal disappears and a normal state signal occurs again in the wake-up signal feeding line 6.

(4) The wake-up signal generator unit 4E sends a normal state signal again after it sends the wake-up signal. The remote device power supply unit will continue waiting for a random period of time further, after it detects a normal state signal in the wake-up signal feeding line 6.

(5) If an occupation signal is detected from the wake-up feeding line port 62 during the delayed waiting period, the remote device power supply unit will freeze the waking-up operation, and terminate the waking-up process till the normal state signal is sent again through the wake-up signal feeding line 6, and continue keeping in sleep state.

(6) If no occupation signal is detected from the wake-up signal feeding line 6 during the delayed waiting period, the remote device power supply unit will output normal supply voltage, so as to wake up the remote device from sleep state into normal operating state.

(7) The wake-up signal generator unit 4E is informed that the remote device has been waken up successfully by detecting that the current in the wake-up signal feeding line 6 is higher than the predetermined threshold value, and outputs a confirmation signal to the control center via the remote device state output port S.

(8) After the wake-up signal generator unit 4E judges that the remote device is already in wake-up state, it will generate an occupation signal and output the occupation signal to the wake-up signal feeding line 6.

When the remote device is to wake up itself, the remote device power supply unit will wake up said remote device power supply unit in sleep state through three steps:

(1) If the remote device power supply unit detects a normal state signal from the wake-up feeding line port 62, it will output normal supply voltage, so as to wake up the remote device from sleep state into normal operating state.

(2) If the remote device power supply unit detects an occupation signal from the wake-up feeding line port 62, it will freeze the waking-up operation, till a normal state signal is sent again from the wake-up signal feeding line 6; then, the remote device power supply unit will wait for a random delay period, and then restart the self-wake-up process from step (1).

(3) After the wake-up signal generator unit judges that the remote device is already in wake-up state, it will generate an occupation signal and output the occupation signal to the wake-up signal feeding line 6.

It should be noted that the person skilled in the art can make modifications and variations to each embodiments of the present invention with reference to the above description without departing from the spirit of the present invention. That is to say, the description in this specification is only illustrative, and shall not be deemed as constituting any limitation to the present invention. The protected scope of the present invention shall be confined by the claims only.

The invention claimed is:

1. A method for waking up remote devices, comprising:
   generating, by a wake-up signal generator unit, voltage signals with different characteristics, including a wake-up signal;
   receiving, by a remote device power supply unit, said wake-up signal; and
   identifying, by the remote device power supply unit, said wake-up signal when in a sleep state,
   wherein, when said remote device power supply unit is in the sleep state and does not output a supply voltage required for normal operation of the remote device, said wake-up signal generator unit generates the wake-up signal as instructed by an external control signal inputted from a wake-up control port, and sends the wake-up signal to the remote device power supply unit through a wake-up signal feeding line that connects the wake-up signal generator unit and the remote device power supply unit, and
   wherein, after said remote device power supply unit in the sleep state correctly identifies the arriving wake-up signal, said remote device power supply unit wakes up to operate normally, and generates and outputs the supply voltage required for normal operation of the remote device, to wake up the remote device from a power-off state.

2. The method of claim 1, wherein said supply voltage has different characteristics that are one of a DC voltage or DC voltage pulse codes with specified polarity and amplitude, and an AC voltage or AC voltage pulse codes with specified frequency, phase, and amplitude, and
   wherein said wake-up signal is one of a DC voltage or DC voltage pulse code with polarity or amplitude different than polarity or amplitude of a normal state, and an AC voltage or AC voltage pulse code with frequency, phase, or amplitude different than frequency, phase, or amplitude of the normal state.

3. The method of claim 1, wherein the wake-up signal generator unit detects feeding current outputted to the wake-up signal feeding line, and determines that the remote device is already in a wake-up state when the feeding current exceeds a predetermined threshold value.

4. The method of claim 1, wherein the wake-up signal generator unit is configured to generate different wake-up signals,
   wherein the remote device power supply unit is configured to receive and identify one of said different wake-up signals when in the sleep state,
   wherein, when the remote device power supply unit is in the sleep state and does not output supply voltage required for normal operation of the remote device, said wake-up signal generator unit selectively generates a specific wake-up signal based on an external control signal inputted from the wake-up control port, and sends the specific wake-up signal to the remote device power supply unit through the wake-up signal feeding line, and wherein, after said remote device power supply unit in the sleep state correctly identifies the arriving specific wake-up signal, said remote device power supply unit wakes up to operate normally, and generates and outputs supply voltage required for normal operation of the remote device, to wake up the remote device from the power-off state.

5. The method of claim 4, wherein said voltage has different characteristics that are one of DC voltage pulse codes with specified polarity and amplitude, and AC voltage pulse codes with specified different frequencies or combinations of frequencies, or AC voltage pulse codes with specified amplitude and phase;

wherein said specific wake-up signal is one of a specified set of DC voltage pulse codes with polarity or amplitude different than polarity or amplitude of the normal state, and a specified set of AC voltage pulse codes with phase or amplitude different than phase or amplitude of the normal state, or a specified set of AC voltage with a combination of different frequency codes.

6. The method of claim 4, wherein, after the remote device power supply unit detects the specific wake-up signal from the wake-up signal feeding line at the wake-up feeding line port, wake up of said remote device power supply unit in the sleep state comprises:

(1) waiting, by the remote device power supply unit, for the specific wake-up signal in the wake-up signal feeding line to disappear, until the normal state signal occurs again;

(2) waiting further, by the remote device power supply unit, for a random period of time;

(3) if an occupation signal is detected from the wake-up feeding line port during a delayed waiting period, freezing, by the remote device power supply unit, a waking-up operation and terminating the waking-up operation until the normal state signal is resent through the wake-up signal feeding line, to maintain the sleep state;

(4) if no occupation signal is detected from the wake-up signal feeding line during the delayed waiting period, outputting, by the remote device power supply unit, supply voltage to wake up the remote device from sleep state to normal operating state; and (5) after the wake-up signal generator unit determines that the remote device is already awake, generating, by the wake-up signal generator unit, an occupation signal and outputs the occupation signal to the wake-up signal feeding line;

wherein said occupation signal is one of a DC voltage or DC voltage pulse with polarity or amplitude different than polarity or amplitude of the normal state, and an AC voltage or AC voltage pulse with frequency, phase or amplitude different than frequency, phase, or amplitude of the normal state.

7. The method of claim 1, wherein, when the remote device awakens itself, the remote device power supply unit wakes said remote device power supply unit from the sleep state by:

(1) if the remote device power supply unit detects a normal state signal from the wake-up feeding line port, outputting, by the remote device power supply unit, a normal supply voltage to wake up the remote device from the sleep state;

(2) if the remote device power supply unit detects an occupation signal from the wake-up feeding line port, freezing, by the remote device power supply unit, the waking-up operation, until a normal state signal is resent from the wake-up signal feeding line, with the remote device power supply unit waiting for a random delay period of time before then restarting the self-wake-up process from step (1); and (3) after the wake-up signal generator unit determines that the remote device is already in wake-up state, generating, by the wake-up signal generator unit, an occupation signal and output the occupation signal to the wake-up signal feeding line;

wherein said occupation signal is one of a DC voltage or DC voltage pulse with polarity or amplitude different than polarity or amplitude of the normal state, and an AC voltage or AC voltage pulse with frequency, phase or amplitude different than frequency, phase, or amplitude of the normal state.

8. A wake-up signal generator unit comprising;

a power supply input port;

a wake-up control port;

a remote device state output port;

a feeding line output port a power supply module that utilizes power provided by the power supply input port to supply power to other modules, wherein said wake-up signal generator unit generates a wake-up signal to wake up a remote device and detect a state of the remote device;

a wake-up signal generator module that generates the wake-up signal under control of an external control signal provided from the wake-up control port and outputs the wake-up signal via the feeding line output port; and a current detection module that detects a power supply state signal of a remote device power supply unit and outputs the power supply state signal via the remote device state output port, wherein said current detection module is connected in series between a voltage output terminal of said power supply module and said feeding line output port via said wake-up signal generator module, wherein said wake-up signal is one of a DC voltage or DC voltage pulse code with polarity or amplitude different than polarity or amplitude of a normal state, and an AC voltage or AC voltage pulse code with frequency, phase or amplitude different than frequency, phase, or amplitude of the normal state, and wherein said power supply state signal is a feeding current.

9. The wake-up signal generator unit of claim 8, wherein the wake-up signal is generated and the power supply state is detected of the remote device power supply units.

10. A remote device power supply unit comprising:

a wake-up feeding line port; and a supply voltage output port, wherein said remote device power supply unit is configured to wake up from sleep state to generate local power supply output and feed back a power supply state signal;

a wake-up signal detection module configured to detect voltage signals with different characteristics inputted from the wake-up feeding line port, determine whether the input voltage signal is a wake-up signal, and output a wake-up indication according to the detection result; and a controllable power supply module configured to receive voltage input from the wake-up feeding line port, output local normal operating supply voltage from the supply voltage output port, and output a power supply state signal via the wake-up feeding line port, according to the wake-up indication outputted from the wake-up signal detection module, wherein said wake-up signal is one of a DC voltage or DC voltage pulse code with polarity or amplitude different than polarity or amplitude of a normal state, and an AC voltage or AC voltage pulse code with frequency, phase or amplitude different than frequency, phase, or amplitude of the normal state, and wherein said power supply state signal is feeding current.

11. The remote device power supply unit of claim 10, wherein wake up from sleep state generates local power output and feeds back the power supply state signal, and wherein a wake-up signal feeding line connects the wake-up signal generator module and the power supply module, and transmits the wake-up signal generated by the wake-up signal generator unit and the power supply state signal generated by the power supply module.

\* \* \* \* \*